(12) United States Patent
Roberts et al.

(10) Patent No.: US 9,404,383 B2
(45) Date of Patent: Aug. 2, 2016

(54) VARIABLE GEOMETRY TURBINE

(71) Applicant: Cummins Turbo Technologies Limited, Huddersfield (GB)

(72) Inventors: Tom J. Roberts, Huddersfield (GB); Robert L. Holroyd, Halifax (GB)

(73) Assignee: CUMMINS TURBO TECHNOLOGIES LIMITED, Huddersfield (GB)

( * ) Notice: Subject to any disclaimer, the term of this patent is extended or adjusted under 35 U.S.C. 154(b) by 0 days.

(21) Appl. No.: 14/253,261

(22) Filed: Apr. 15, 2014

(65) Prior Publication Data
US 2014/0248138 A1 Sep. 4, 2014

Related U.S. Application Data

(63) Continuation of application No. 13/055,913, filed as application No. PCT/GB2009/001805 on Jul. 22, 2009, now Pat. No. 8,764,388.

(30) Foreign Application Priority Data

Jul. 25, 2008 (GB) .................... 0813615.2

(51) Int. Cl.
*F01D 17/14* (2006.01)
*F01D 17/16* (2006.01)
(Continued)

(52) U.S. Cl.
CPC ............ *F01D 17/143* (2013.01); *F01D 17/167* (2013.01); *F02B 37/22* (2013.01);
(Continued)

(58) Field of Classification Search
CPC ..... F01D 17/143; F01D 17/167; F02B 37/24; F02B 37/22; F02C 6/12; F05D 2220/40; Y10T 29/49321; Y02T 10/144
USPC .......... 415/150, 157, 158; 60/602; 29/889.21, 29/525.01, 525.13
See application file for complete search history.

(56) References Cited

U.S. PATENT DOCUMENTS

| 2,996,996 A | 8/1961 | Jassniker |
| 4,403,913 A * | 9/1983 | Fisker ............... 415/150 |

(Continued)

FOREIGN PATENT DOCUMENTS

| DE | 4218299 C1 | 3/1993 | |
| DE | EP 1128025 A2 * | 8/2001 | ............ F01D 17/165 |

(Continued)

OTHER PUBLICATIONS

United Kingdom Search Report, GB0813615.2, Cummins Turbo Technologies Limited, Nov. 14, 2008.
(Continued)

*Primary Examiner* — Craig Kim
*Assistant Examiner* — Wayne A Lambert
(74) *Attorney, Agent, or Firm* — Taft Stettinius & Hollister LLP

(57) ABSTRACT

A variable geometry turbine comprises: a turbine wheel in a housing for rotation about a turbine axis; an annular inlet passage defined between respective radial inlet surfaces of first and second wall members, at least one of said first and second wall members being moveable along the turbine axis to vary the size of the inlet passage; an array of vanes extending across the inlet passage, said vanes being connected to said first wall member; a complementary array of vane slots defined by the second wall member, said vane slots configured to receive said vanes to accommodate relative movement between the first and second wall members; the second wall member comprising at least two axially adjacent co-axial plates, a first plate defining a first array of openings which overlie a second array of openings defined by a second plate so as to define said array of vane slots, said first plate being fixed to said second plate.

9 Claims, 24 Drawing Sheets

(51) Int. Cl.
*F02B 37/22* (2006.01)
*F02B 37/24* (2006.01)
*F02C 6/12* (2006.01)

(52) U.S. Cl.
CPC ............... *F02B 37/24* (2013.01); *F02C 6/12* (2013.01); *F05D 2220/40* (2013.01); *Y02T 10/144* (2013.01); *Y10T 29/49321* (2015.01)

(56) References Cited

U.S. PATENT DOCUMENTS

| | | | | |
|---|---|---|---|---|
| 4,416,583 | A * | 11/1983 | Byrns | 415/148 |
| 4,544,325 | A * | 10/1985 | Rogo et al. | 415/150 |
| 4,557,665 | A * | 12/1985 | Szczupak | 415/158 |
| 4,643,635 | A * | 2/1987 | Leachman, Jr. | 415/1 |
| 4,844,690 | A * | 7/1989 | DeLaurier et al. | 415/148 |
| 4,932,835 | A * | 6/1990 | Sorokes | 415/150 |
| 5,169,286 | A * | 12/1992 | Yamada | 415/48 |
| 5,441,383 | A * | 8/1995 | Dale | F01D 17/143 415/150 |
| 5,452,986 | A * | 9/1995 | Osborne et al. | 415/165 |
| 5,868,552 | A | 2/1999 | McKean et al. | |
| 5,941,684 | A * | 8/1999 | Parker | 415/156 |
| 6,338,614 | B1 | 1/2002 | LaRue | |
| 6,451,454 | B1 * | 9/2002 | Hasz et al. | 428/668 |
| 6,652,224 | B2 * | 11/2003 | Mulloy et al. | 415/158 |
| 6,694,733 | B1 * | 2/2004 | Bernardini | F01D 17/167 415/157 |
| 6,931,849 | B2 * | 8/2005 | Parker | F01D 17/14 415/157 |
| 6,932,565 | B2 * | 8/2005 | Garrett et al. | 415/119 |
| 7,097,432 | B1 * | 8/2006 | Lombard | F01D 17/143 415/157 |
| 7,475,540 | B2 * | 1/2009 | Parker | F01D 17/14 415/145 |
| 8,721,268 | B2 * | 5/2014 | Moore | F01D 17/143 415/158 |
| 2008/0089782 | A1 * | 4/2008 | Parker et al. | 415/150 |

FOREIGN PATENT DOCUMENTS

| | | |
|---|---|---|
| EP | 0189364 A2 | 7/1986 |
| WO | 2006131724 A1 | 12/2006 |
| WO | 2007045874 A1 | 4/2007 |

OTHER PUBLICATIONS

International Search Report and Written Opinion, PCT/GB2009/001805, Cummins Turbo Technologies Limited, International Searching Authority/European Patent Office, Oct. 21, 2010.

* cited by examiner

VARIABLE GEOMETRY TURBINE

The present invention relates to a variable geometry turbine. Particularly, but not exclusively, the present invention relates to variable geometry turbochargers.

A conventional turbine essentially comprises an exhaust gas driven turbine wheel mounted on a rotatable shaft within a turbine housing connected downstream of an engine outlet manifold. Rotation of the turbine wheel drives either a compressor wheel mounted on the other end of the shaft within a compressor housing to deliver compressed air to an engine intake manifold, or a gear which transmits mechanical power to an engine flywheel or crankshaft. The turbine shaft is conventionally supported by journal and thrust bearings, including appropriate lubricating systems, located within a bearing housing.

Turbochargers are well known devices for supplying air to the intake of an internal combustion engine at pressures above atmospheric pressure (boost pressures). In turbochargers, the turbine stage comprises a turbine chamber within which the turbine wheel is mounted; an annular inlet passageway defined between opposite radial walls arranged around the turbine chamber; an inlet arranged around the inlet passageway; and an outlet passageway extending from the turbine chamber. The passageways and chambers communicate such that pressurised exhaust gas admitted to the inlet chamber flows through the inlet passageway to the outlet passageway via the turbine and rotates the turbine wheel. Turbine performance can be improved by providing vanes, referred to as nozzle vanes, in the inlet passageway so as to deflect gas flowing through the inlet passageway towards the direction of rotation of the turbine wheel.

Turbines may be of a fixed or variable geometry type. Variable geometry turbines differ from fixed geometry turbines in that the size of the inlet passageway can be varied to optimise gas flow velocities over a range of mass flow rates so that the power output of the turbine can be varied to suit varying engine demands. For instance, when the volume of exhaust gas being delivered to the turbine is relatively low, the velocity of the gas reaching the turbine wheel is maintained at a level which ensures efficient turbine operation by reducing the size of the annular inlet passageway. Turbochargers provided with a variable geometry turbine are referred to as variable geometry turbochargers.

In one known type of variable geometry turbine, an axially moveable wall member, generally referred to as a "nozzle ring", defines one wall of the inlet passageway. The position of the nozzle ring relative to a facing wall of the inlet passageway is adjustable to control the axial width of the inlet passageway. Thus, for example, as gas flows through the turbine decreases, the inlet passageway width may be decreased to maintain gas velocity and optimise turbine output. This arrangement differs from another type of variable geometry turbine in which a variable guide vane array comprises adjustable swing guide vanes arranged to pivot so as to open and close the inlet passageway.

The nozzle ring may be provided with vanes which extend into the inlet and through vane slots provided in a "shroud" defining the facing wall of the inlet passageway to accommodate movement of the nozzle ring. Alternatively vanes may extend from the fixed facing wall and through vane slots provided in the nozzle ring.

Typically the nozzle ring may comprise a radially extending wall (defining one wall of the inlet passageway) and radially inner and outer axially extending walls or flanges which extend into an annular cavity behind the radial face of the nozzle ring. The cavity is formed in a part of the turbocharger housing (usually either the turbine housing or the turbocharger bearing housing) and accommodates axial movement of the nozzle ring. The flanges may be sealed with respect to the cavity walls to reduce or prevent leakage flow around the back of the nozzle ring.

In one common arrangement of a variable geometry turbine the nozzle ring is supported on rods extending parallel to the axis of rotation of the turbine wheel and is moved by an actuator which axially displaces the rods. Nozzle ring actuators can take a variety of forms, including pneumatic, hydraulic and electric and can be linked to the nozzle ring in a variety of ways. The actuator will generally adjust the position of the nozzle ring under the control of an engine control unit (ECU) in order to modify the airflow through the turbine to meet performance requirements.

As mentioned above, as the nozzle ring is moved to adjust the axial width of the inlet passageway, the guide vanes may extend into accurately defined vane slots in a shroud plate to accommodate the movement. Typically, shroud plates are made by turning from bar, where each plate is essentially a disc of material, often provided with a circumferential groove extending around the periphery of the disc to accommodate a locating ring which retains the disc within the turbine housing. After turning, the vane slots are usually produced in the disc, one at a time, by numerical control (NC) laser cutting. In order to ensure efficient functioning of the nozzle ring and shroud plate assembly it is important that the size, shape and position of the vane slots accurately matches that of the guide vanes. This introduces very fine tolerances to the manufacture of both the shroud plate and the nozzle ring carrying the guide vanes. Production of shroud plates and nozzle rings is therefore an undesirably complicated and costly process requiring very careful control of a number of different manufacturing processes to ensure the two components function together satisfactorily.

It is an object of the present invention to obviate or mitigate one or more of the problems set out above.

According to a first aspect of the present invention there is provided variable geometry turbine comprising:
  a turbine wheel supported in a housing for rotation about a turbine axis;
  an annular inlet passage defined between respective radial inlet surfaces of first and second wall members, at least one of said first and second wall members being moveable along the turbine axis to vary the size of the inlet passage;
  an array of vanes extending across the inlet passage, said vanes being connected to said first wall member;
  a complementary array of vane slots defined by the second wall member, said vane slots being configured to receive said vanes to accommodate relative movement between the first and second wall members;
  wherein the second wall member comprises at least two axially adjacent co-axial plates, a first of said plates defining a first array of openings which overlie a second array of openings defined by a second of said plates so as to define said array of vane slots, said first plate being fixed to said second plate.

Forming the second wall member from at least two axially adjacent co-axial plates is advantageous since it can simplify the process of producing the wall member with the appropriate dimensions and arrangement of vanes slots to suit a particular application. Preferably the co-axial plates are concentrically arranged with respect to one another. Moreover, the plates are preferably annular in shape.

In a preferred embodiment the cross-sectional shape transverse to said turbine axis of at least one of the openings in said first array of openings more closely matches the cross-sectional shape transverse to said turbine axis of the vane that said at least one opening is arranged to receive than the cross-sectional shape transverse to said turbine axis of at least one of the openings in said second array of openings. Providing at least one of the openings in the second plate with a cross-sectional shape which less closely matches the cross-sectional shape of the vane which it is intended to receive, enables cheaper and simpler manufacturing processes to be used in the manufacture of the second plate. For example, while the cross-sectional shape of the openings in the first plate is preferably very similar to the cross-sectional shape of the vane which the opening was intended to receive, the underlying opening in the second plate may have a relatively simple cross-sectional shape such as a round, square, rectangular or oval shape provided the opening in the second plate is sufficiently large to encompass the overlying opening in the first plate. Thus it is preferred that said at least one opening in said first array of openings may axially overlie said at least one opening in said second array of openings to define one slot of said array of vanes slots.

In a preferred example, the openings in the second plate have a substantially rectangular cross-sectional shape but with the short edges of the rectangle being curved for ease of manufacture.

In a further preferred embodiment said first plate may be substantially rotationally and/or radially fixed relative to said second plate. Preferably the first plate is substantially fixed both rotationally and radially relative to the second plate. The first and second plates may be laminated together. Moreover, the first and second plates may be fixed together by an adhesive, braze, rivet, screw, weld or the like.

One of said first and second plates may define at least one axially extending projection, such as a semi-shear or locating pin, configured for receipt in a complementary recess defined by the other of the first and second plates.

The first and second plates may be positioned axially relative to the first wall member to suit a particular application. For certain applications it may be preferable for the first plate may be positioned axially closer to said first wall member than said second plate, or for said second plate to be positioned axially closer to said first wall member than said first plate.

The second wall member may comprise any number of additional co-axial or concentric plates. Thus, the second wall member may comprise at least a third co-axial or concentric plate that is axially adjacent to said second plate, said third plate defining a third array of openings which overlie the second array of openings defined by the second plate so as to further define said array of vane slots. The third plate may be annular in shape. It is thus preferred that the second plate is interposed between the first and third plates.

In order to further simplify and reduce the cost of manufacturing the third (and any subsequent) co-axial or concentric plates, it is preferred that the cross-sectional shape transverse to said turbine axis of at least one of the openings in said first array of openings more closely matches the cross-sectional shape transverse to said turbine axis of the vane that said at least one opening is arranged to receive than the cross-sectional shape transverse to said turbine axis of at least one of the openings in said third array of openings.

The cross-sectional shape of the third array of openings may be the same or may differ from the cross-sectional shape of the second array of openings. Thus, said cross-sectional shape transverse to said turbine axis of at least one of the openings in said third array of openings may substantially match the cross-sectional shape transverse to said turbine axis of at least one of the openings in said second array of openings.

Preferably said at least one opening in said third array of openings axially overlies said at least one opening in said second array of openings to further define one slot of said array of vanes slots.

Preferably the third plate is fixed to the second plate.

The third plate may be laminated to the second plate. Moreover, the third plate may be fixed to the second plate by an adhesive, braze, rivet, screw, weld or the like.

One of said second and third plates may define at least one further axially extending projection (e.g. semi-shear or locating pin) configured for receipt in a complementary recess defined by the other of the second and third plates.

The second wall member may be supported within a turbine housing in any appropriate manner provided the means of fixing the second wall member is appropriate for the particular application.

Said second wall member may define a circumferential groove extending around the radially outermost edge of the second wall member, said groove arranged to receive a locating ring to retain the second wall member within the turbine housing. This may be achieved by the first and third plates possessing larger respective diameters than the second plate, such that the difference in the diameters of the three plates at least partly defines said circumferential groove.

Rather than using a locating ring the second wall member may be connected to a turbine housing using some form of fastener such as a bolt, rivet or the like. In this case, it may be advantageous to form at least one of the plates making up the second wall member so as to define a larger outer diameter than one or more of the other plates making up the second wall member such that one or more fasteners can be inserted through the radially extended portion of the larger plate and into the turbine housing thereby fixing the second wall member to the housing.

In a second aspect of the present invention there is provided a variable geometry turbine comprising:
 a turbine wheel supported in a housing for rotation about a turbine axis;
 an annular inlet passage defined between respective radial inlet surfaces of first and second wall members, at least one of said first and second wall members being moveable along the turbine axis to vary the size of the inlet passage;
 an array of vanes extending across the inlet passage, said vanes being connected to said first wall member;
 a complementary array of vane slots defined by the second wall member, said vane slots being configured to receive said vanes to accommodate relative movement between the first and second wall members;
wherein the second wall member comprises at least two axially adjacent co-axial plates, a first of said plates defining a first array of openings which overlie a second array of openings defined by a second of said plates so as to define said array of vane slots, and further wherein said first plate is rotationally and/or radially moveable relative to said second plate.

In this way, the precise positioning of the first array of openings relative to the second array of openings can be adjusted, which will thereby adjust the location of the vanes slots defined by the overlapping regions of the first and second arrays of openings. This allows the arrangement of vane slots in the second wall member to be optimised for a particular array of vanes connected to the first wall member. This is advantageous since it allows the array of vanes to be manufactured to a wider tolerance thereby reducing the cost and complexity of manufacturing the first wall member and array of vanes.

In a preferred embodiment the second plate is positioned axially closer to the first wall member than the first plate. This results in the second plate facing into the inlet passage of the turbine. Thus, in embodiments in which the cross-sectional shape of the openings in the first array of openings more closely matches that of the vanes than the second array of openings, it is the second array of openings which is exposed to gases flowing through the inlet passage of the turbine rather than the first array of openings. In certain embodiments this will result in openings in the second plate of larger cross-sectional area facing into the inlet passageway and the openings in the first plate of smaller cross-sectional area facing in the opposite direction towards the wall of the turbine housing to which the first wall member is connected.

It is preferred that said second plate is substantially rotationally and/or radially fixed relative to said turbine housing. It is particularly preferred that the second plate is substantially fixed both rotationally and radially to the turbine housing, for example using a suitable type of fastener such as a bolt, rivet or the like.

In one embodiment the second plate may have a larger diameter than the first plate such that a region of the second plate extends radially beyond the circumferential edge of the first plate, said region of the second plate cooperating with one or more fasteners to fasten said second plate to the turbine housing. Any desirable number of fasteners of any suitable type could be used but it is envisaged that it may be advantageous to use at least three or four bolts received in apertures defined by the region of the second plate which extends radially beyond the circumferential edge of the first plate.

It will be appreciated that it is important to ensure that the first and second plates can move relative to one another without causing undesirable levels of wear to either plate. Moreover, undesirably high levels of friction between the plates may damage them making them susceptible to failure and/or corrosion. Thus, a surface of at least one of the first and second plates which faces the other of the first and second plates may be provided with an anti-wear, anti-friction and/or anti-corrosion coating.

In the second aspect of the invention where the first plate is rotationally and/or radially moveable relative to the second plate, this may only be possible during initial optimisation of the second wall member for use with a particular first wall member and array of vanes. By way of example, a braze could be applied between the first and second plates and the vanes inserted into their corresponding vane slots at a sufficiently high temperature such that the braze remain sufficiently fluid to permit relative rotational and/or radial movement between the plates. Once the optimum relative position of the first plate relative to the second plate has been determined for that particular array of vanes, the temperature of the second wall member could then be decreased such that the braze solidifies and thereby fixed the first and second plates together such that rotational and/or radial movement is no longer possible. Alternatively, the first and second plates may be arranged so as to permit free rotational and/or radial movement throughout the lifetime of use of the turbine.

In a still further preferred embodiment of the first aspect of the present invention, said first plate may comprise first and second segments defining respective first and second openings from said first array of openings, said first segment being displaceable relative to said second segment within a major plane of the first plate.

In this embodiment the first plate is formed in segments which are displaceable relative to one another so that their optimum displacement relative to a particular nozzle ring can be readily determined. This embodiment therefore affords a further method for optimising the arrangement of vane slots in the second wall member for receipt of vanes from a particular first wall member. As mentioned above, adjustment may be carried out initially prior to use, for example in combination with brazing the first and second plates together, or a suitable anti-wear, anti-frictional, anti-corrosion coating may be provided on one or more of the segments so that they can move freely relative to one another within the major plane of the first plate throughout use of the turbine.

Each of said segments may comprise generally radially extending leading and trailing edges connected by radially inner and outer edges. A clearance may be defined between the leading edge of one segment and the trailing edge of a neighbouring segment. This clearance can then accommodate relative displacements between neighbouring segments.

Said radially inner and outer edges may possess different lengths. Preferably said radially inner edge is shorter than said radially outer edge. Thus, it is preferred that each segment is flared from its radially inner edge to its radially outer edge.

Said leading and trailing edges may be swept forward relative to said radial line. The leading edge may be swept forward to a greater extent than the trailing edge.

At least one of said leading and trailing edges may be curved relative to a radial line passing through said segment and the turbine axis. Moreover at least one of said inner and outer edges of each segment may be curved.

It is thus preferred that each segment of the first plate has a scimitar-like cross-sectional shape as can be seen in the specific embodiments described below in relation to FIGS. 14A, 14B and 15.

Preferably both of said inner and outer edges of each segment are curved, and said inner and outer edges possess a substantially similar curvature.

In a preferred version of the present embodiment, said second plate comprises first and second segments defining respective first and second openings from said second array of openings, said first segment of the second plate being displaceable relative to said second segment of the second plate within a major plane of the second plate.

Said first segment of the first plate may axially overlie said first segment of the second plate. Preferably overlying segments from the first and second plates are connected together such that rotational and/or radial displacement of a segment relative to the segment it overlies is prevented. Any suitable type of connection between overlying segments may be used, such as brazing.

In a similar fashion to the segments of the first plate, each of said segments of the second plate may comprise generally radially extending leading and trailing edges connected by radially inner and outer edges.

Preferably a further clearance is defined between the leading edge of one segment and the trailing edge of a neighbouring segment. Said further clearance can accommodate relative displacement of segments of the second plate. Where overlying segments of the first and second plates are connected together so as to move in unison, it is preferable that the clearances defined between segments of the first plate and segments of the second plate are similar in shape so as to afford a similar degree of relative movement between segments in the first plate and segments in the second plate.

Said first segment of the second plate may be circumferentially offset with respect to said first segment of the first plate such that said clearance defined between segments of the first plate is circumferentially offset with respect to said further clearance defined between segments of the second plate. In this way the clearances defined between segments of the first plate do not axially overlie clearances defined between segments of the second plate so as to avoid presenting a leak path for gases flowing through the turbine inlet passageway.

The major plane of the first plate and/or second plate may be substantially orthogonal to the turbine axis.

It is preferred that said first plate is positioned axially closer to said first wall member than said second plate.

The periphery of the second plate may be received within a radially extending channel defined by the turbine housing. The second plate may possess a larger diameter than the first plate such that a region of the second plate may be located radially outwardly of the first plate, at least part of said region being retained within said channel by a retaining member. Said retaining member may be positioned axially closer to said first wall member than said second plate. Said retaining member may be fastened to the turbine housing. The means of fastening may take any appropriate form, such as bolts, rivets and/or screws. Moreover any desirable number and/or arrangement of fasteners may be employed. By way of example only, it is envisaged that providing the retaining member with four equally angularly spaced apertures to receive suitable fasteners may be suitable.

At least one of the co-axial or concentric plates comprised in the second wall member may be formed from stainless steel.

According to a third aspect of the present invention there is provided a variable geometry turbine comprising:
  a turbine wheel supported in a housing for rotation about a turbine axis;
  an annular inlet passage defined between respective radial inlet surfaces of first and second wall members, at least one of said first and second wall members being moveable along the turbine axis to vary the size of the inlet passage;
  an array of vanes extending across the inlet passage, said vanes being connected to said first wall member;
  a complementary array of vane slots defined by the second wall member, said vane slots being configured to receive said vanes to accommodate relative movement between the first and second wall members;
  wherein the second wall member comprises a first plate defining a first array of openings so as to define said array of vane slots, said first plate comprising first and second segments defining respective first and second openings from said first array of openings, said first segment being displaceable relative to said second segment within a major plane of the first plate.

Preferably the first plate is annular in shape.

Each of said segments may comprise generally radially extending leading and trailing edges connected by radially inner and outer edges. A clearance may be defined between the leading edge of one segment and the trailing edge of a neighbouring segment. This clearance can then accommodate relative displacements between neighbouring segments.

Said radially inner and outer edges may possess different lengths. Preferably said radially inner edge may be shorter than said radially outer edge. Thus, it is preferred that each segment is flared from its radially inner edge to its radially outer edge.

Said leading and trailing edges may be swept forward relative to said radial line. The leading edge may be swept forward to a greater extent than the trailing edge.

At least one of said leading and trailing edges may be curved relative to a radial line passing through said segment and the turbine axis. Moreover at least one of said inner and outer edges of each segment may be curved.

It is thus preferred that each segment of the first plate has a scimitar-like cross-sectional shape as can be seen in the specific embodiments described below in relation to FIGS. 14A, 14B and 15.

Both of said inner and outer edges of each segment may be curved, and said inner and outer edges may possess a substantially similar curvature.

The major plane of the first plate may be substantially orthogonal to the turbine axis.

The first plate comprised in the second wall member may be formed from any suitable material, such as stainless steel.

In a preferred embodiment of the third aspect, the second wall member comprises a second plate which is positioned axially adjacent to the first plate and said second plate being arranged co-axially or concentrically with respect to said first plate, the first plate defining a first array of openings which overlie a second array of openings defined by the second plate so as to define said array of vane slots.

In a preferred example of this embodiment the cross-sectional shape transverse to said turbine axis of at least one of the openings in said first array of openings may more closely match the cross-sectional shape transverse to said turbine axis of the vane that said at least one opening is arranged to receive than the cross-sectional shape transverse to said turbine axis of at least one of the openings in said second array of openings.

In this way, the openings in the second array of openings can be manufactured to a wider tolerance than those in the first array which are intended to closely match the cross-sectional shape of the vanes which the slots defined by the overlapping openings are intended to accommodate. As mentioned above in respect of other embodiments of the first and second aspects of the present invention, allowing one of the plates making up the second wall member to be manufactured to a wider tolerance reduces the cost and complexity of manufacturing this component.

Said at least one opening in said first array of openings may axially overlie said at least one opening in said second array of openings to define one slot of said array of vanes slots.

In a preferred version of the present embodiment, said second plate comprises first and second segments defining respective first and second openings from said second array of openings, said first segment of the second plate being displaceable relative to said second segment of the second plate within a major plane of the second plate.

Said second plate comprises first and second segments defining respective first and second openings from said second array of openings, said first segment of the second plate being displaceable relative to said second segment of the second plate within a major plane of the second plate.

Said first segment of the first plate may axially overlie said first segment of the second plate. Preferably overlying segments from the first and second plates are connected together such that rotational and/or radial displacement of a segment relative to the segment it overlies is prevented. Any suitable type of connection between overlying segments may be used, such as brazing.

In a similar fashion to the segments of the first plate, each of said segments of the second plate may comprise generally radially extending leading and trailing edges connected by radially inner and outer edges.

A further clearance may be defined between the leading edge of one segment and the trailing edge of a neighbouring segment. Said further clearance can accommodate relative displacement of segments of the second plate. Where overlying segments of the first and second plates are connected together so as to move in unison, it is preferable that the clearances defined between segments of the first plate and segments of the second plate are similar in shape so as to afford a similar degree of relative movement between segments in the first plate and segments in the second plate.

Said first segment of the second plate may be circumferentially offset with respect to said first segment of the first plate such that said clearance defined between segments of the first plate is circumferentially offset with respect to said further clearance defined between segments of the second plate. In this way the clearances defined between segments of the first plate do not axially overlie clearances defined between segments of the second plate so as to avoid presenting a leak path for gases flowing through the turbine inlet passageway.

The major plane of the second plate may be substantially orthogonal to the turbine axis.

In an additional embodiment of the first aspect of the present invention wherein at least the first plate is segmented, it is preferred that said first plate may be positioned axially closer to said first wall member than said second plate.

The periphery of the second plate may be received within a radially extending channel defined by the turbine housing. The second plate may possess a larger diameter than the first plate such that a region of the second plate may be located radially outwardly of the first plate, at least part of said region being retained within said channel by a retaining member. Said retaining member may be positioned axially closer to said first wall member than said second plate. Said retaining member may be fastened to the turbine housing.

The means of fastening may take any appropriate form, such as bolts, rivets and/or screws. Moreover any desirable number and/or arrangement of fasteners may be employed. By way of example only, it is envisaged that providing the retaining member with four equally angularly spaced apertures to receive suitable fasteners may be suitable.

The second plate comprised in the second wall member may be formed from any suitable material such as, stainless steel.

The array of vane slots may be provided as a substantially annular array of vane slots. The vane slots comprised in said annular array of vane slots may be substantially equi-angularly spaced.

One of said first and second wall members may be axially moveable and the other of said first and second may be fixed. Said fixed wall member may be defined by a facing wall of said housing.

According to a fourth aspect of the present invention there is provided a method for assembling a shroud plate for a variable geometry turbine, said shroud plate comprising at least two plates, the method comprising aligning a first of said plates with a second of said plates such that a first array of openings defined by the first plate overlies a second array of openings defined by the second plate so as to define an array of vane slots.

Preferably said at least two plates are concentrically aligned with respect to one another.

The shroud plate forming part of the fourth aspect of the present invention may be considered as the second wall member of the first aspect of the present invention. Moreover, in the preferred embodiments of the third aspect of the present invention employing at least two plates to form the second wall member, the method according to the fourth aspect of the present invention defined above is equally applicable.

Preferably the plates are concentric and/or may be arranged such that, when mounted within a turbine, they are co-axially aligned. Alignment of the first and second plates may comprise locating at least one projection such as a semi-shear or locating pin defined by one of said first and second plates within a complementary recess defined by the other of the first and second plates.

In a first preferred embodiment of the fourth aspect of the present invention, following alignment of the first and second plates, said plates are fixed together such that said first plate is substantially fixed rotationally and/or radially relative to said second plate. The plates may be fixed together by an adhesive, braze, rivet, screw, weld or the like. In another preferred embodiment, following alignment of the first and second plates, the plates are laminated together such that said first plate may be substantially fixed rotationally and/or radially relative to said second plate.

In a further preferred embodiment alignment of the first and second plates may comprise inserting first and second vanes connected to a variable geometry turbine nozzle ring into respective first and second vane slots from said array of vane slots. During and/or following insertion of said vanes into said vane slots, one of the plates may be rotated and/or radially displaced relative to the other of the plates to adjust the degree to which the first array of openings overlie the second array of openings so as to change the position of the first vane slot relative to the second vane slot. In this way, the relative orientation between slots can be optimised to suit a particular array of vanes connected to a turbine nozzle ring. Optimisation may be carried out prior to use of the turbine, in which case the first and second plates may be fixed together in the optimised configuration following adjustment. Alternatively, the plates may retain the ability to move relative to one another during use of the turbine so that optimisation is essentially carried out each time the array of vanes is inserted into the vane slots.

In a still further preferred embodiment said first plate may comprise first and second segments defining respective first and second openings from said first array of openings, said first segment being displaceable relative to said second segment within a major plane of the first plate, the method further comprising displacing said first segment relative to said second segment within the major plane of the first plate during and/or following insertion of said vanes into said vane slots to adjust the position of the first segment relative to the second segment so as to change the position of the first vane slot relative to the second vane slot. Segmenting the first plate forming part of the shroud plate enables the relative arrangement of vane slots to be optimised to match the arrangement of vanes on a turbine nozzle ring. As mentioned above in respect of the previous preferred embodiment, optimisation may be carried out before use of the turbine after which the segments of the first plate are fixed relative to one another, or the segments may remain displaceable throughout the lifetime of the turbine such that optimisation is carried out each time a vane is attached to a two line nozzle ring into the vane slots.

The or each plate which forms part of the shroud plate may be formed from any desirable material in any appropriate manner. For example, at least one of the plates may be formed by stamping from a rolled strip of stainless steel.

According to a fifth aspect of the present invention there is provided a method for preparing a shroud plate for use in a variable geometry turbine, said shroud plate comprising a first plate defining a first array of openings so as to define an array of vane slots, and said first plate comprising first and second segments defining respective first and second openings from said first array of openings, said first segment being displaceable relative to said second segment within a major plane of the first plate, wherein the method comprises inserting first and second vanes connected to a variable geometry turbine nozzle ring into respective first and second vane slots from said array of vane slots, and displacing said first segment relative to said second segment within the major plane of the first plate during and/or following insertion of said vanes into said vane slots so as to adjust the position of the first segment relative to the second segment such that the position of the first vane slot relative to the second vane slot more closely matches the position of the first vane relative to the second vane than before adjustment of the relative position of the first and second segments.

The fifth aspect of the present invention employs a segmented plate with a plurality of segments which can move relative to one another so as to permit optimisation of the relative displacement in relation to an array of vanes connected to a variable geometry turbine nozzle ring. As mentioned above in connection with previous aspects of the present invention, such optimisation can be carried out once before the turbine is used and the segments then fixed together in their optimised orientation or the segments can remain free to move relative to one another such that optimisation is essentially carried out each time the array of vanes is inserted into the vane slots defined by the shroud plate.

Other advantageous and preferred features of the invention will be apparent from the following description.

Specific embodiments of the present invention will now be described, by way of example only, with reference to the accompanying drawings, in which.

Figure 1:
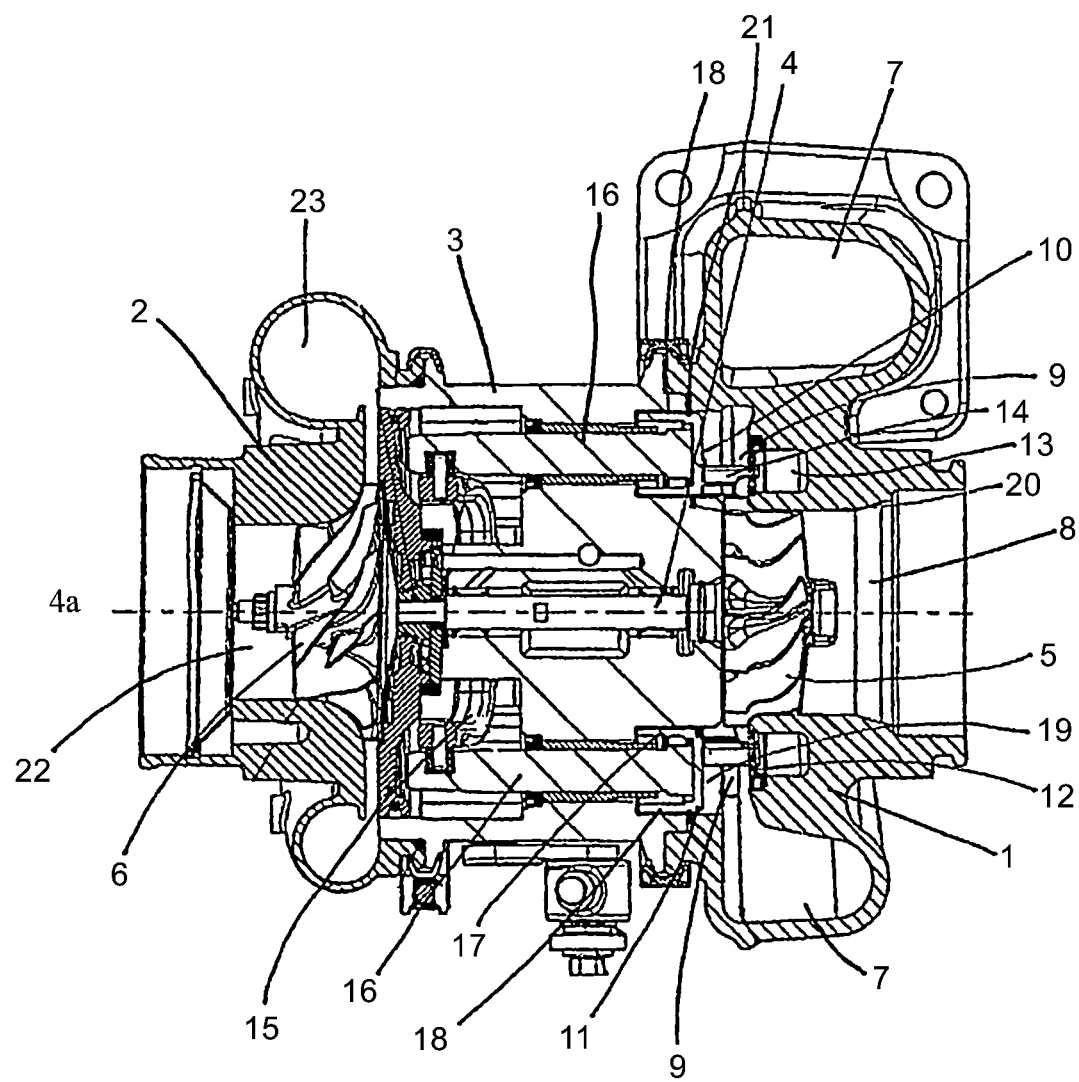
FIG. 1 is an axial cross-section through a known variable geometry turbocharger.

Referring to FIG. 1, this illustrates a known variable geometry turbocharger comprising a variable geometry turbine housing 1 and a compressor housing 2 interconnected by a central bearing housing 3. A turbocharger shaft 4 extends from the turbine housing 1 to the compressor housing 2 through the bearing housing 3. A turbine wheel 5 is mounted on one end of the shaft 4 for rotation within the turbine housing 1, and a compressor wheel 6 is mounted on the other end of the shaft 4 for rotation within the compressor housing 2. The shaft 4 rotates about turbocharger axis 4a on bearing assemblies located in the bearing housing 3.

The turbine housing 1 defines an inlet volute 7 to which gas from an internal combustion engine (not shown) is delivered. The exhaust gas flows from the inlet volute 7 to an axial outlet passageway 8 via an annular inlet passageway 9 and the turbine wheel 5. The inlet passageway 9 is defined on one side by a face 10 of a radial wall of a moveable annular wall member 11, commonly referred to as a "nozzle ring", and on the opposite side by an annular shroud 12 which forms the wall of the inlet passageway 9 facing the nozzle ring 11. The shroud 12 covers the opening of an annular recess 13 in the turbine housing 1.

The nozzle ring 11 supports an array of circumferentially and equally spaced inlet vanes 14 each of which extends across the inlet passageway 9. The vanes 14 are orientated to deflect gas flowing through the inlet passageway 9 towards the direction of rotation of the turbine wheel 5. When the nozzle ring 11 is proximate to the annular shroud 12, the vanes 14 project through suitably configured slots in the shroud 12, into the recess 13.

The position of the nozzle ring 11 is controlled by an actuator assembly of the type disclosed in U.S. Pat. No. 5,868,552. An actuator (not shown) is operable to adjust the position of the nozzle ring 11 via an actuator output shaft (not shown), which is linked to a yoke 15. The yoke 15 in turn engages axially extending actuating rods 16 that support the nozzle ring 11. Accordingly, by appropriate control of the actuator (which may for instance be pneumatic or electric), the axial position of the rods 16 and thus of the nozzle ring 11 can be controlled. The speed of the turbine wheel 5 is dependent upon the velocity of the gas passing through the annular inlet passageway 9. For a fixed rate of mass of gas flowing into the inlet passageway 9, the gas velocity is a function of the width of the inlet passageway 9, the width being adjustable by controlling the axial position of the nozzle ring 11. FIG. 1 shows the annular inlet passageway 9 fully open. The inlet passageway 9 may be closed to a minimum by moving the face 10 of the nozzle ring 11 towards the shroud 12.

The nozzle ring 11 has axially extending radially inner and outer annular flanges 17 and 18 that extend into an annular cavity 19 provided in the turbine housing 1. Inner and outer sealing rings 20 and 21 are provided to seal the nozzle ring 11 with respect to inner and outer annular surfaces of the annular cavity 19 respectively, whilst allowing the nozzle ring 11 to slide within the annular cavity 19. The inner sealing ring 20 is supported within an annular groove formed in the radially inner annular surface of the cavity 19 and bears against the inner annular flange 17 of the nozzle ring 11. The outer sealing ring 20 is supported within an annular groove formed in the radially outer annular surface of the cavity 19 and bears against the outer annular flange 18 of the nozzle ring 11.

Gas flowing from the inlet volute 7 to the outlet passageway 8 passes over the turbine wheel 5 and as a result torque is applied to the shaft 4 to drive the compressor wheel 6. Rotation of the compressor wheel 6 within the compressor housing 2 pressurises ambient air present in an air inlet 22 and delivers the pressurised air to an air outlet volute 23 from which it is fed to an internal combustion engine (not shown).

Figure 2A:
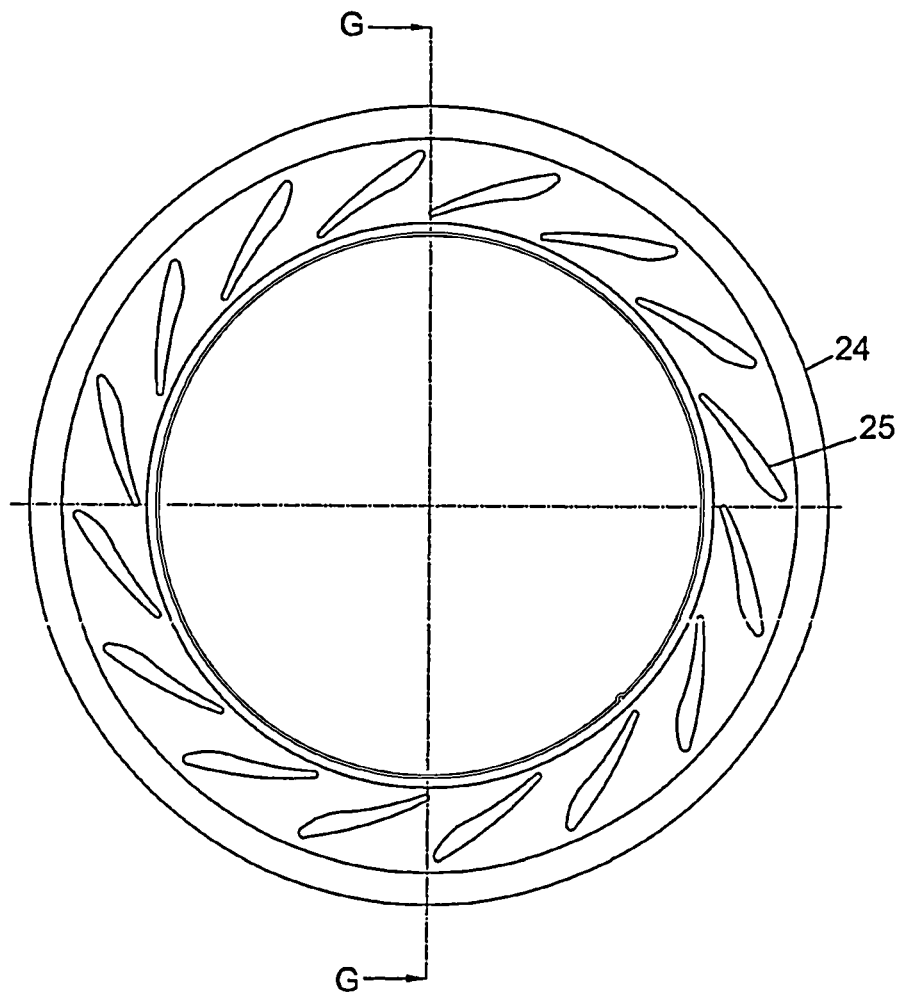
FIG. 2A is a front view of a prior art shroud plate for use in a variable geometry turbine.
Figure 2B:
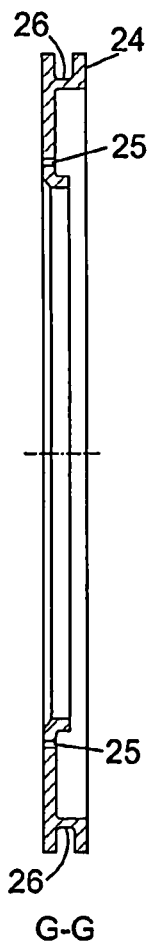
FIG. 2B is a cross-sectional view taken along line G-G of the shroud plate of FIG. 2A.

Referring to FIGS. 2A and 2B, there is shown a prior art shroud plate for use in a variable geometry turbine. The shroud plate 24 is annular in shape and defines an annular array of vane slots 25 for receipt of vanes attached to a nozzle ring of a variable geometry turbine of the kind shown in FIG. 1. The relative positioning of each vane slot 25 compared to the other vane slots 25 and the cross-sectional shape of each vane slot 25 should be very carefully controlled so as to ensure that each vane is correctly received within its respective vane slot 25 whilst also ensuring that disturbance to airflow passing over the vane slots 25 is minimised. The shroud plate 24 must therefore be manufactured to very high intolerances both in terms of the shape and position of each vane slot 25 to ensure proper functioning of the shroud plate 24 in combination with the nozzle ring (not shown). The shroud plate 24 defines a circumferential slot 26 which extends around the radially outermost edge of the shroud plate 24. The slot 26 receives a ring (not shown) to support the shroud plate 24 within a turbine housing.

The shroud plate 24 is manufactured by turning from bar. Once a blank disc has been formed, the circumferential slot 26 is then cut into the radially outer edge of the disc. The vane slots 25 are then cut through the disc using, for example, laser cutting. Commonly, the vane slots 25 are cut sequentially, i.e. one at a time, making the manufacturing process relatively lengthy and expensive.

Figure 3A:
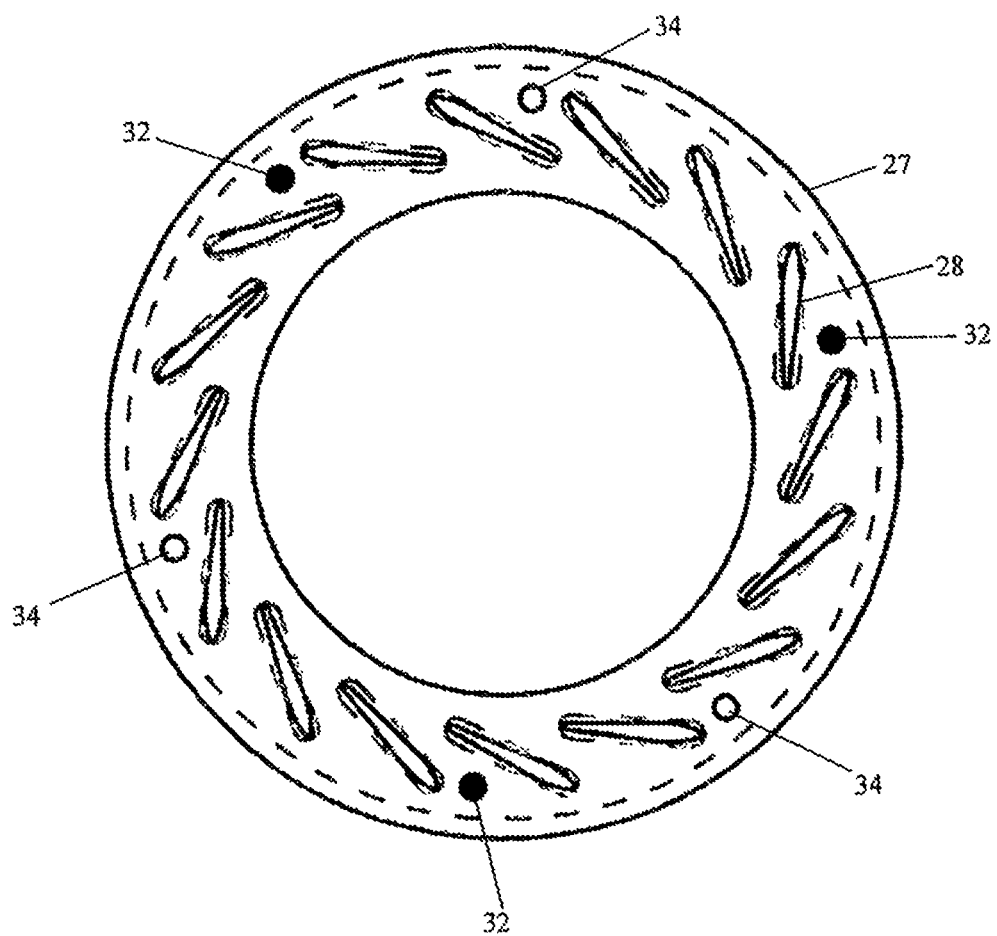
FIG. 3A is a front view of a shroud plate according to a first embodiment of the present invention.
Figure 3B:
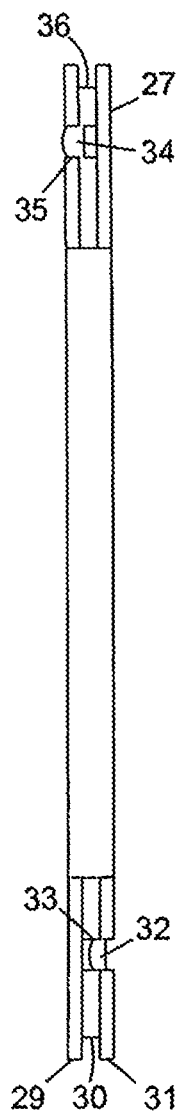
FIG. 3B is a cross-sectional view of the shroud plate of FIG. 3A.

FIGS. 3A and 3B show a first embodiment of a shroud plate 27 in accordance with the present invention. The shroud plate 27 is again of generally annular form and defines an array of vane slots 28 to receive vanes connected to a nozzle ring of a variable geometry turbine of the kind depicted in FIG. 1.

The shroud plate 27 is composed of three co-axial, concentric plates 29, 30, 31 which have been laminated together to prevent any rotational or radial movement of one of the plates relative to the other plates. The plates 29, 30, 31 may be laminated together in any suitable way, for example brazing. The centre plate 30 may be coated with a braze (e.g. by electroless nickel plating) on both radial faces and the two outer plates 29, 31 then pressed into contact before placing the stacked plates 29, 30, 31 in a furnace, followed by appropriate cooling. In the embodiment shown in FIGS. 3A and 3B the plates 29, 30, 31 are arranged such that the plate 29 is the front (or outer) plate which will face an inlet volute of a variable geometry turbine and so it is this plate 29 which will be exposed to gas flowing from the inlet volute to an outlet passageway of the turbine. The plate which is intended to face the turbine housing is plate 31 which is commonly referred to as the back (or inner) plate. The back plate 31 defines three axially extending projections 32 which are received in complementary recesses 33 defined by the plate 30 which is positioned intermediate the front and back plates 29, 31. The projections 32 can be in the form of locating pins, semi-shears or any other suitable formation which would permit correct alignment of the back and intermediate plates 31, 30. Similarly, the intermediate plate 30 is also provided with a plurality of axially extending projections 34 which are received in complementary recesses 35 defined by the front plate 29, thereby providing a means to ensure correct alignment of the intermediate plate 30 with respect to the front plate 29.

Similar axially extending projections, such as semi-shears or pins, could be formed in the front plate 29, projecting forwards, away from the centre and back plates 30, 31, such that they would project towards a nozzle ring during use. In this way, these projections could control the minimum inlet passage width of a turbine between the nozzle ring and shroud plate 27. Such projections could supplement or replace pads which are often formed on the radial face of the nozzle ring for the same purpose, thereby reducing the cost and complexity of manufacturing the nozzle ring.

It can be seen from FIGS. 3A and 3B that the intermediate plate 30 possesses a smaller outer diameter than the front and back plates 29, 31. This is to provide the shroud plate 27 with a circumferential slot 36 extending around its radially outer edge for receipt of a ring (not shown) to support the shroud plate 27 within the turbine housing (not shown). It will be appreciated that circumferential slot 36 is provided to perform essentially the same function as circumferential slot 26 of the prior art shroud plate shown in FIGS. 2A and 2B. Each of the three plates 29, 30, 31 making up the shroud plate 27 of the present invention will now be described in more detail.

Figure 4A:
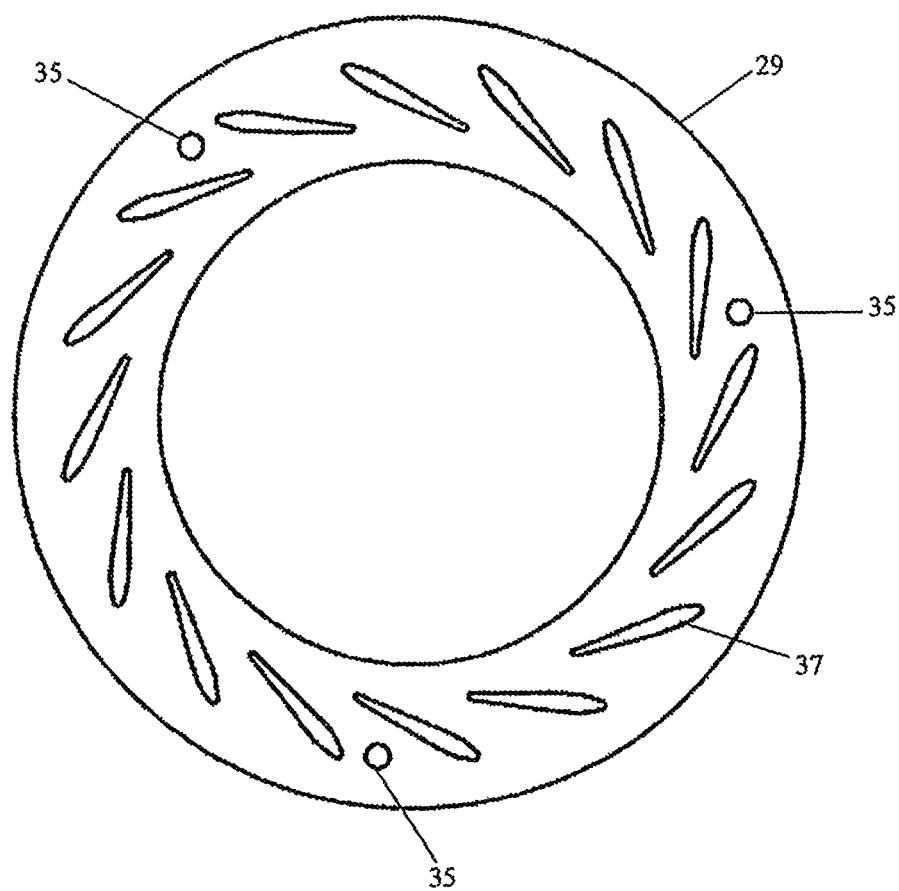
FIG. 4A is a front view of a front plate of the shroud plate of FIGS. 3A and 3B.
Figure 4B:
FIG. 4B is a cross-sectional view of the front plate of FIG. 4A.

The front plate 29 shown in FIGS. 4A and 4B defines an annular array of openings 37 whose cross-sectional shape and relative annular positioning closely matches the shape and positioning of vanes of a nozzle ring (not shown) with which the shroud plate 27 will be used. That is, both the openings 37 and the vanes must be manufactured to a fine tolerance with respect to one another. In this way, the openings 37 can accommodate relative axial movement between the shroud plate 27 and the nozzle ring (not shown) but cause minimal disturbance to gas flowing through the inlet volute of the turbine.

Figure 5A:
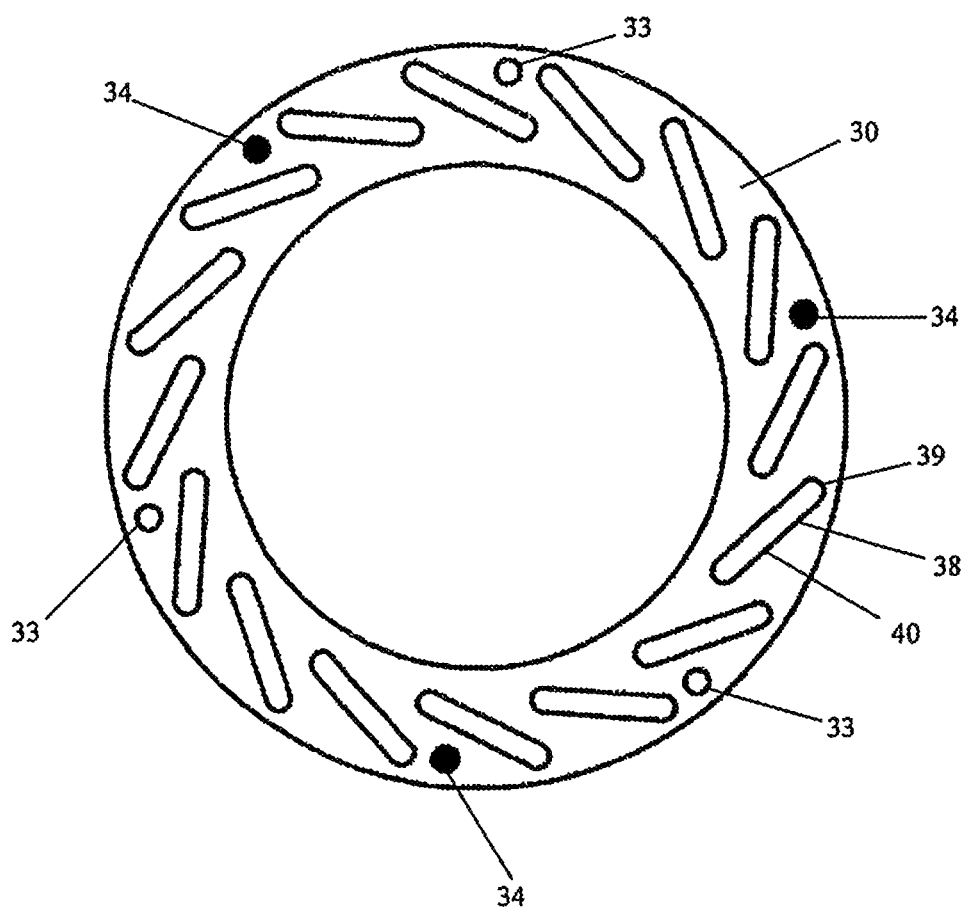
FIG. 5A is a front view of an intermediate plate of the shroud plate of FIGS. 3A and 3B.
Figure 5B:
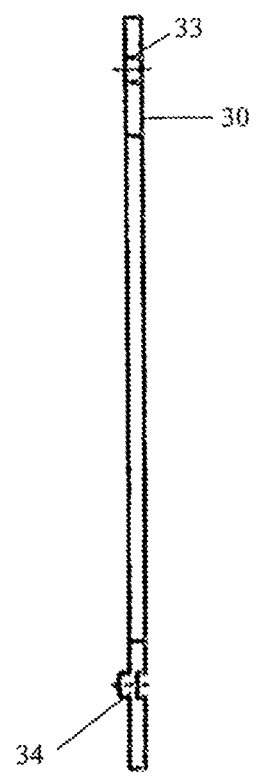
FIG. 5B is a cross-sectional view of the intermediate plate of FIG. 5A.

The intermediate plate 30 is shown in FIGS. 5A and 5B. It can be observed in FIG. 5A that the intermediate plate 30 defines an annular array of openings 38 whose relative annular position is similar to that of the openings 37 in the front plate 29, however, the cross-sectional shape of each opening 38 takes a generally rectangular form with curved short sides 39 interconnecting long sides 40 of similar length to the length of each opening 37 in the front plate 29. The general form of each opening 38 in the intermediate plate 30 is therefore easier to manufacture using more robust tooling than the openings 37 in the front plate 29. The intermediate plate 30 can therefore be manufactured to wider tolerances at relatively low cost compared to the front plate 29.

Figure 6A:
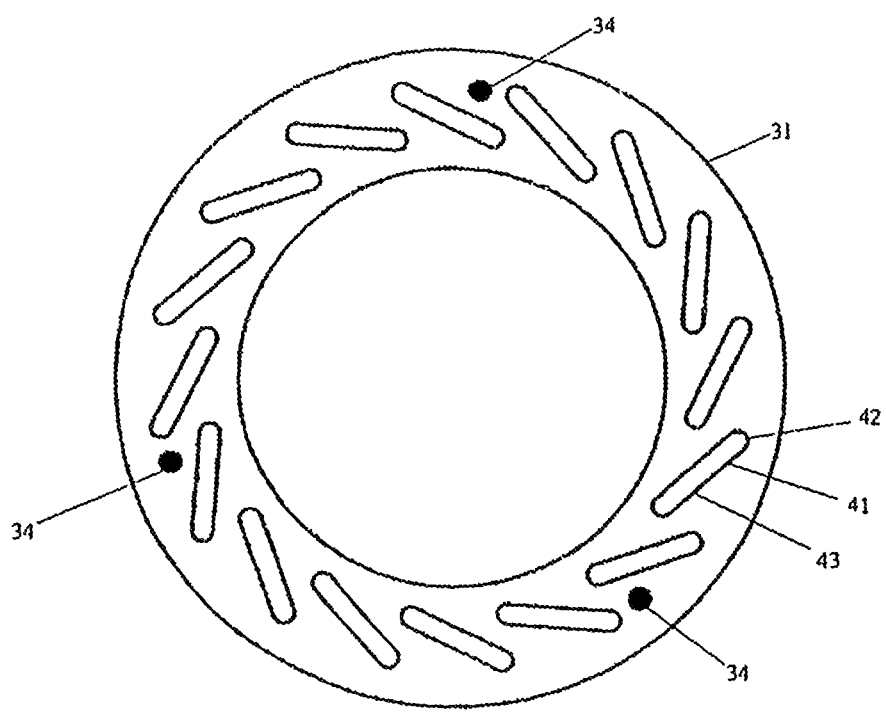
FIG. 6A is a front view of a back plate of the shroud plate of FIGS. 3A and 3B.
Figure 6B:
FIG. 6B is a cross-sectional view of the back plate of FIG. 6A.

The back plate 31 is shown in FIGS. 6A and 6B, and defines a similar annular array of openings 41 to the array of openings 38 defined by the intermediate plate 30. That is, the relative annular positioning of each opening 41 in the back plate 31 substantially matches that of the fine tolerance openings 37 defined by the front plate 29, but the general form of each opening 41 in the back plate 31 is generally rectangular with curved short sides 42 connecting straight long sides 43 whose length approximates the length of the fine tolerance openings 37 in the front plate 29. Consequently, the manufacturing tolerances required in respect of the back plate 31 are wider than those in the front plate 29, making the back plate 31 easier and cheaper to manufacture.

Figure 7:
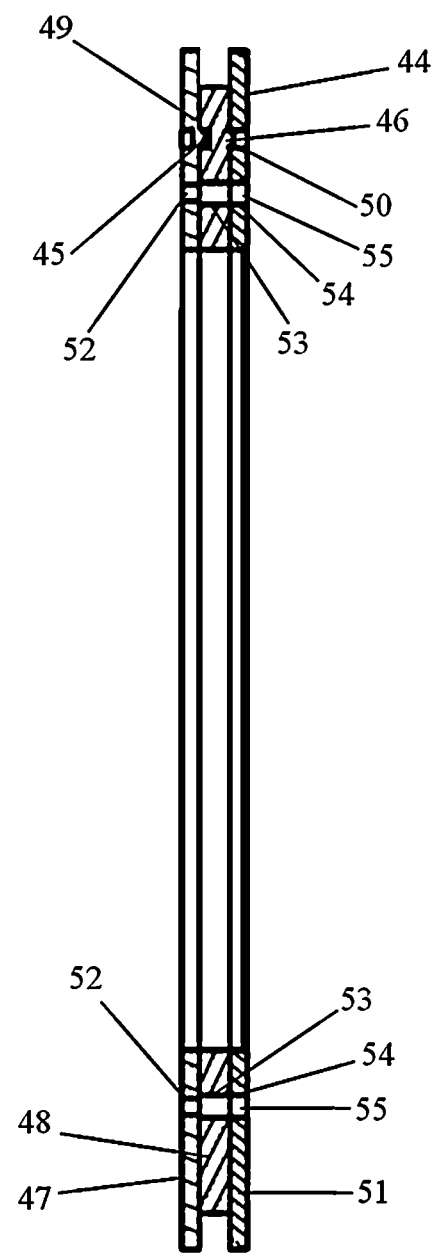
FIG. 7 is a cross-sectional view of a shroud plate according to a second embodiment of the present invention.

FIG. 7 depicts a second embodiment of a laminated shroud plate. The shroud plate 44 shown in FIG. 7 is similar in structure to the shroud plate 27 of FIGS. 3A to 6B, however, the shroud plate 44 shown in FIG. 7 incorporates a series of locating pins 45, 46 which project axially from the front plate 47 and intermediate plate 48 respectively to be received in complementary recesses 49, 50 defined by the intermediate plate 48 and the back plate 51 respectively. The shroud plate 44 depicted in FIG. 7 includes fine tolerance openings 52 in the front plate 47 overlying wider tolerance openings 53, 54 in the intermediate plate 48 and back plate 51 respectively. The openings 52, 53, 54 thus define vane slots 55 extending through the full width of the shroud plate 44.

Figure 8A:
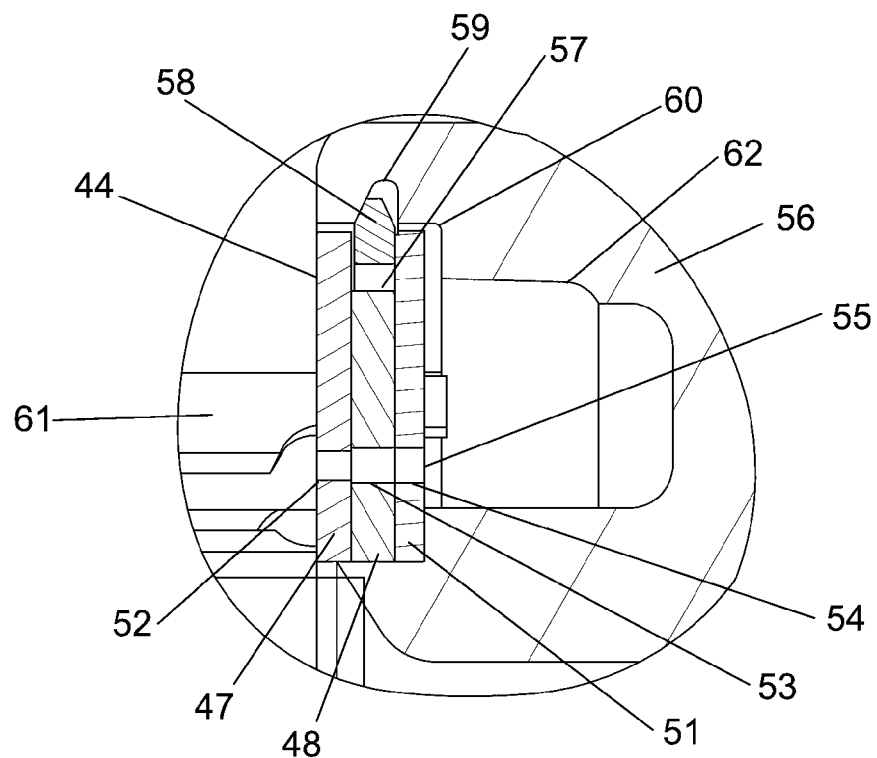
FIG. 8A is a cross-sectional view of an upper portion of the shroud plate of FIG. 7 supported within a turbine housing.
Figure 8B:
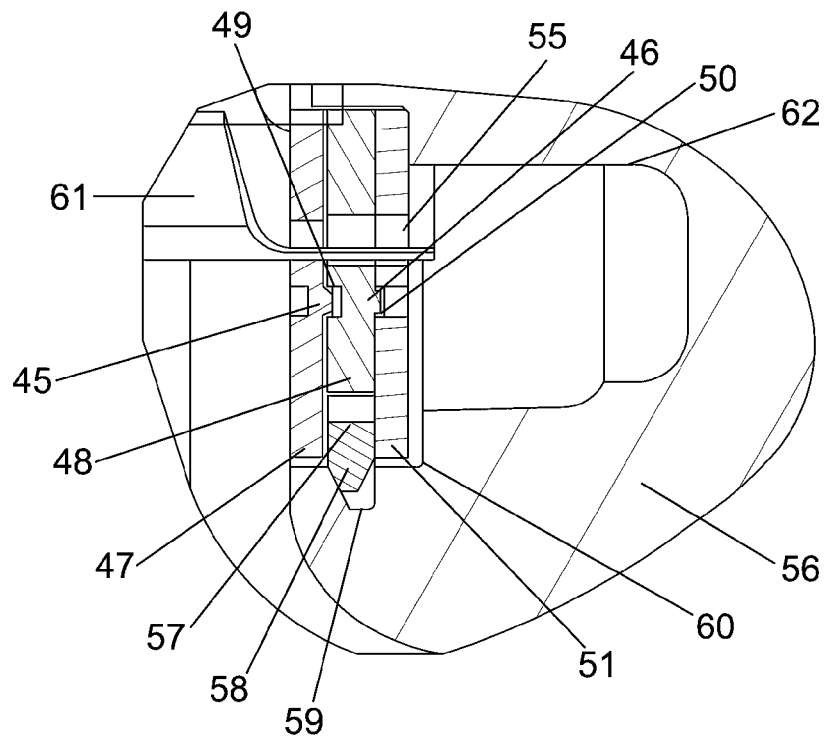
FIG. 8B is a cross-sectional view of a lower portion of the shroud plate of FIG. 7 supported within the turbine housing.

FIGS. 8A and 8B show how the shroud plate 44 depicted in FIG. 7 is supported within a turbine housing 56 during use. A circumferential slot 57 defined around the radially outer edge of the shroud plate 44 is dimensioned to receive a ring 58 which itself is dimensioned to be received within an annular channel 59 defined by the turbine housing 56. In this way, the shroud plate 44 is securely supported within an axially extending clearance 60 defined by the turbine housing 56 in the correct orientation to receive vanes 61 attached to a nozzle ring (not shown) of a turbine. Axial movement of the nozzle ring causes the vanes 61 to be received through the vane slots 55 and extend into a suitably dimensioned clearance 62 defined by the turbine housing 56.

Figure 9:
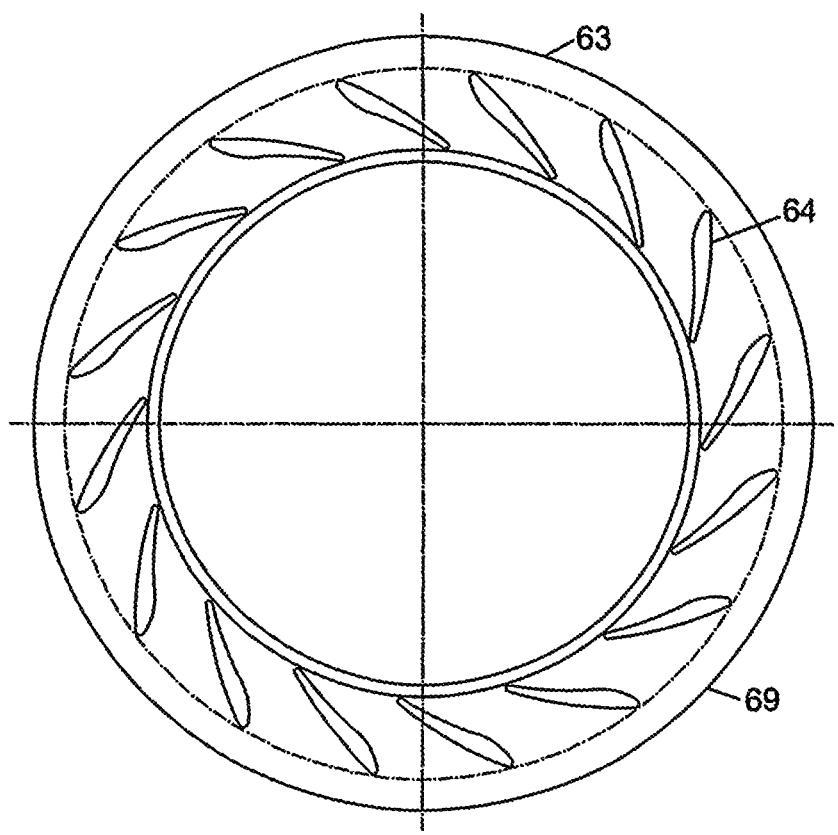
FIG. 9 is a front view of a back plate of a shroud plate according to a third embodiment of the present invention.
Figure 10:
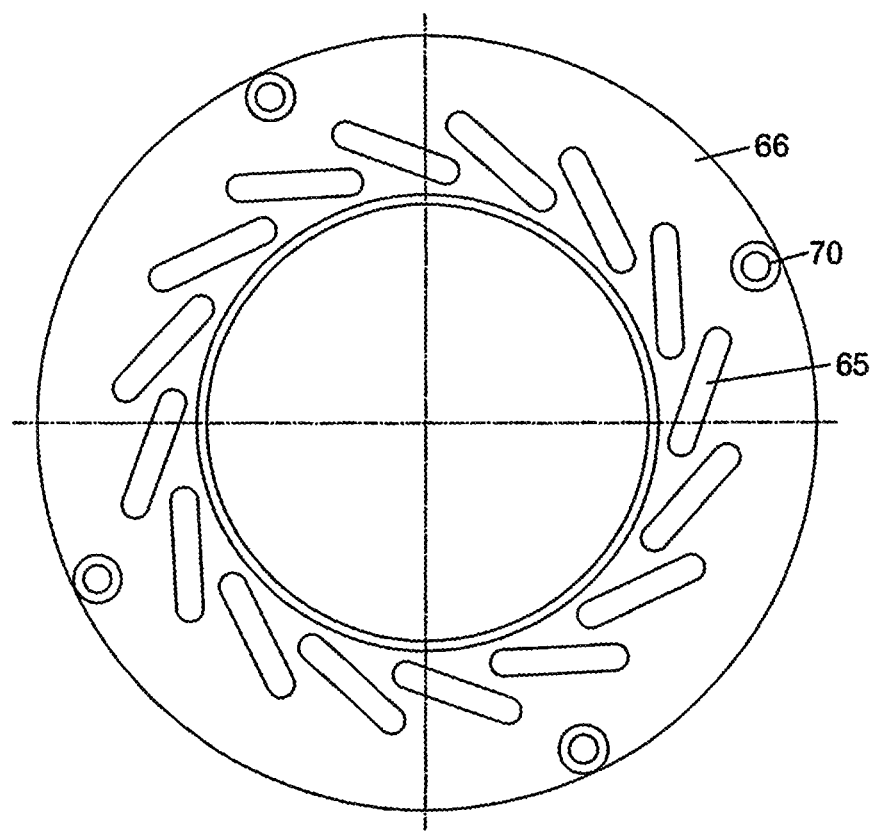
FIG. 10 is a front view of a front plate to be used with the back plate of FIG. 9 to form the shroud plate according to a third embodiment of the present invention.
Figure 11:
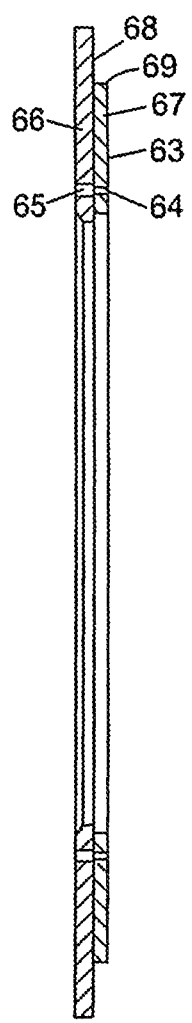
FIG. 11 is a cross-sectional view of the shroud plate according to the third embodiment of the present invention with the back plate of FIG. 9 attached to the front plate of FIG. 10.

Referring now to FIGS. 9, 10 and 11 there is shown a third embodiment according to the present invention. In FIG. 9 a back plate 63 in the form of an annular ring defines an annular array of openings 64 which are positioned so as to overlie an annular array of openings 65 in a front plate 66 when the front plate 66 is connected to the back plate 63 to form an assembled shroud plate 67, as shown in FIG. 11.

The cross-sectional shape of the openings 64 defined in the back plate 63 more closely matches the cross-sectional shape of vanes attached to a nozzle ring (not shown) with which the assembled shroud plate 67 is intended to be used than the openings 65 defined by the front plate 66. This embodiment therefore varies from the first two embodiments described above in relation to FIGS. 3A to 8B in that the two-piece shroud plate 67 according to the third embodiment positions the finer tolerance openings 64 in the back plate 63 and the wider tolerance openings 65 in the front plate 66 which will face gas flowing through the inlet volute of a turbine in which the shroud plate 67 is to be used.

As can be seen from FIGS. 9 to 11, the back plate 63 defines a smaller outer diameter than the front plate 66 such that a radially outer region 68 of the front plate 66 extends radially beyond the periphery 69 of the back plate 63. The extended region 68 of the front plate 66 defines four equally angularly spaced apertures 70 for receipt of fasteners, for example bolts, rivets or the like (not shown), to fasten the front plate 66 of the shroud plate 67 to the turbine housing as described in more detail below in relation to FIGS. 12A to 13B.

Figure 12A:
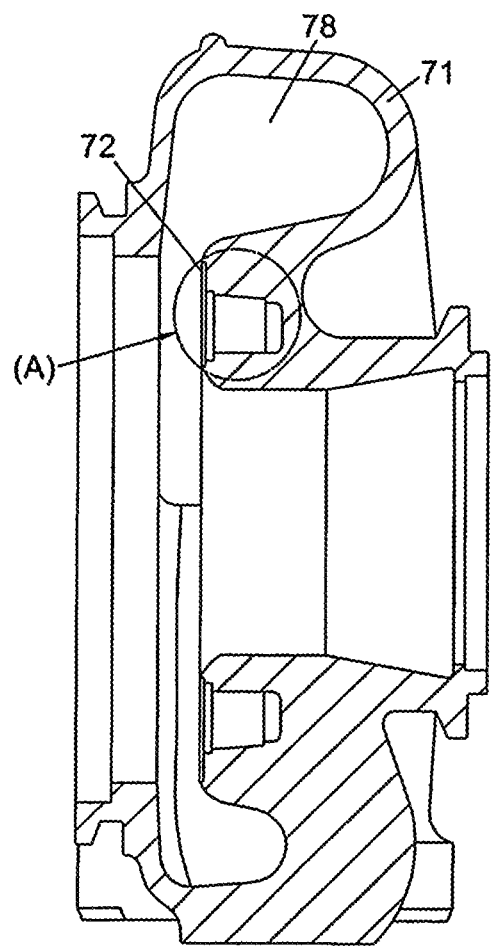
FIG. 12A is a cross-sectional view of a turbine housing without a shroud plate or nozzle ring.
Figure 13A:
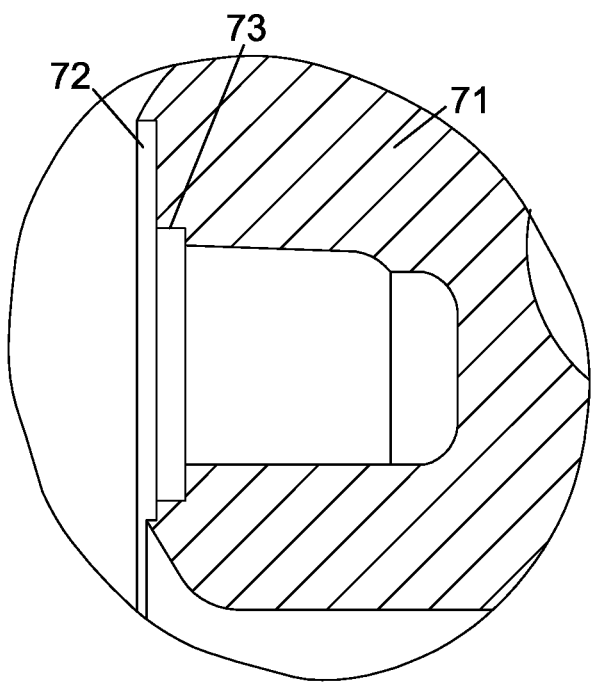
FIG. 13A is a detailed cross-sectional view of the circled portion of the turbine housing of FIG. 12A.

FIG. 12A is a cross-sectional view of a turbine housing 71 prior to location of the shroud plate 67 from FIGS. 9 to 11 within the housing 71. A more detailed view of the circled area A of FIG. 12A is shown in FIG. 13A. As can be seen from FIGS. 12A and 13A the turbine housing 71 defines an annular recess 72 for receipt of the front plate 66 of the shroud plate 67 and a further annular recess 73 lying rearwardly of the other recess 72, the rear recess 73 being suitably dimensioned to receive the back plate 63 of the shroud plate 67.

Figure 12B:
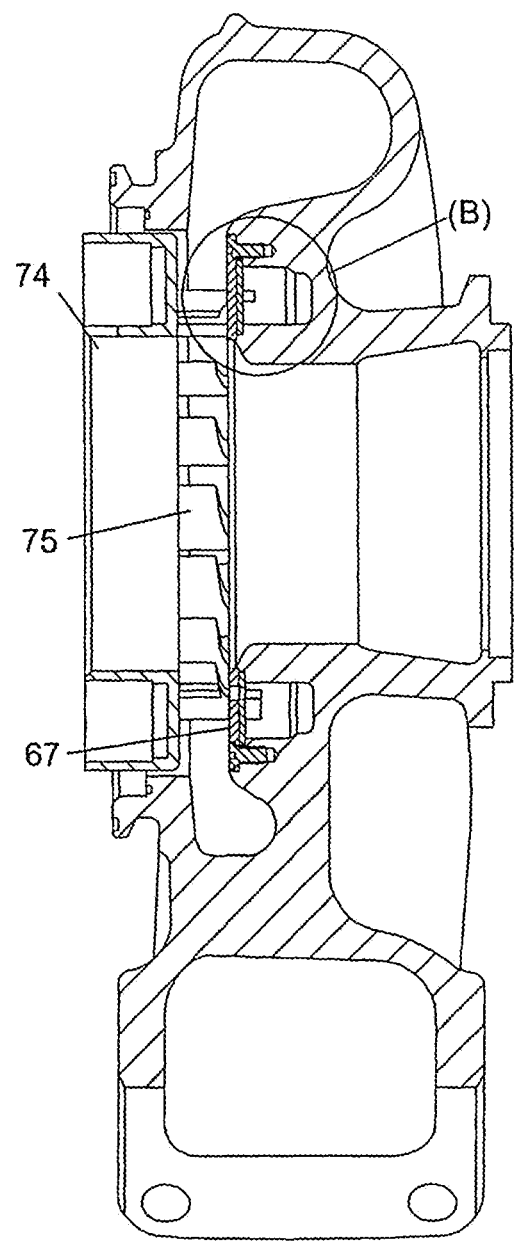
FIG. 12B is a cross-sectional view of the turbine housing of FIG. 12A with the shroud plate of FIG. 11 fastened to the turbine housing and a nozzle ring located axially adjacent to the shroud plate.
Figure 13B:
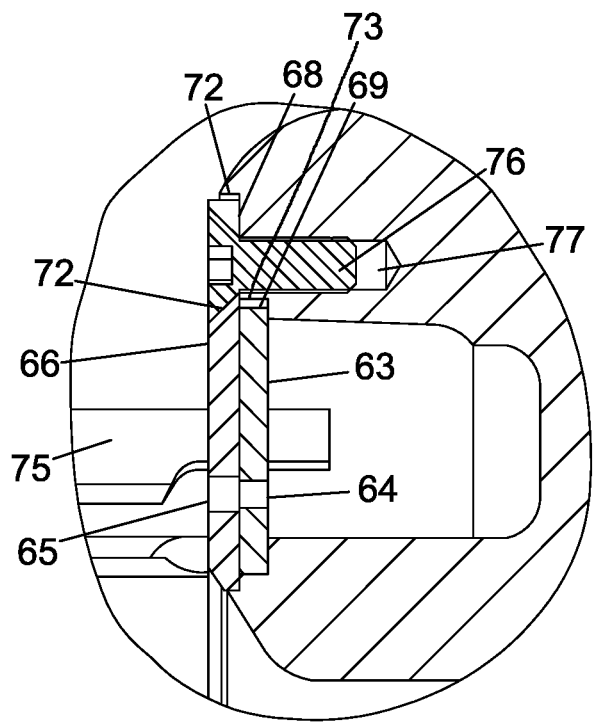
FIG. 13B is a detailed cross-sectional view of the circled portion of FIG. 12B showing the means of connection of the shroud plate of FIG. 11 to the turbine housing.

When it is desired to mount the shroud plate 67 within the turbine housing 71 the front and back plates 66, 63 are inserted into their respective recesses 72, 73 with the correct alignment to ensure that the wide tolerance openings 65 correctly overlie the fine tolerance openings 64 in the back plate 63 so as to define vane slots extending through the full thickness of the shroud plate 67 for receipt of vanes attached to a nozzle ring as shown in FIGS. 12B and 13B and as now described in more detail.

FIG. 12B shows a cross-sectional view of a turbine housing with the shroud plate 67 in situ together with a nozzle ring 74 which has an annular array of axially extending vanes 75 attached thereto. Once the back plate 63 and front plate 66 have been received in the respective recesses 73, 72 in the turbine housing 71, and correctly aligned, bolts 76 or any other suitable fastener are inserted through apertures 70 defined by the front plate 66 into axially extending holes 77 defined by the turbine housing 71. In this way, the front plate 66 is secured against the turbine housing 71 so as to substantially prevent any relative movement between the front plate 66 and the turbine housing 71.

In contrast to the first and second embodiments of the present invention in which the three plates 29, 30, 31 making up the shroud plate 27 were laminated together so as to prevent any relative movement, the back plate 63 of the third embodiment is not fixed to the front plate 66, such that the back plate 63 is permitted to rotate and/or displace radially relative to the front plate 66 even after having been mounted within the turbine housing 71. This is to permit adjustment of the degree to which the fine tolerance openings 64 in the back plate 63 overlie the wider tolerance openings 65 in the front plate 66 which together define the vane slots. This in turn enables the alignment of a particular set of vane slots with a particular set of vanes 75 attached to the nozzle ring 74 to be accurately adjusted.

The shroud plate 67 according to the third embodiment of the present invention therefore provides a similar benefit in terms of allowing the shroud plate 67 to be formed from a plurality of discs wherein one set of openings is manufactured to a wider tolerance than the other set of openings (providing manufacturing and cost benefits as detailed above in respect of the first and second embodiments) but also the precise alignment of the back plate 63 and therefore the vane slots, can be adjusted after mounting the shroud plate 67 within the turbine housing 71, such that fine manufacturing tolerances are only required in respect of the shape of the back plate 63 and the openings 64 rather than the position of the back plate 63 in the turbine housing 71.

In the third embodiment described above, the back plate 63 lies entirely axially behind the front plate 66, but it will be appreciated that it would be possible to modify the structure of the front and back plates 66, 63 such that a part of the plate which can rotate and/or slide may be located nearer to the front of the shroud plate 67 which faces the gas flowing through the inlet volute 78 of the turbine housing 71. In this way, at least some of the fine tolerance openings 64 could be exposed to the gas flowing through the inlet volute rather than the wide tolerance openings 65, which would have the benefit of reducing disturbance to the gas flow.

The back plate 63 may be manufactured from any appropriate material, for example 304 stainless steel or the like. The front plate 66 may be manufactured from the same material as the back plate 63, however, it may be advantageous to employ a material which better suits the thermal expansion of the material from which the turbine housing 71 is manufactured (typically iron) since the front plate 66 is bolted to the turbine housing 71. Suitable materials (e.g. for use with an iron turbine housing 71) include 420 stainless steel.

Figure 14A:
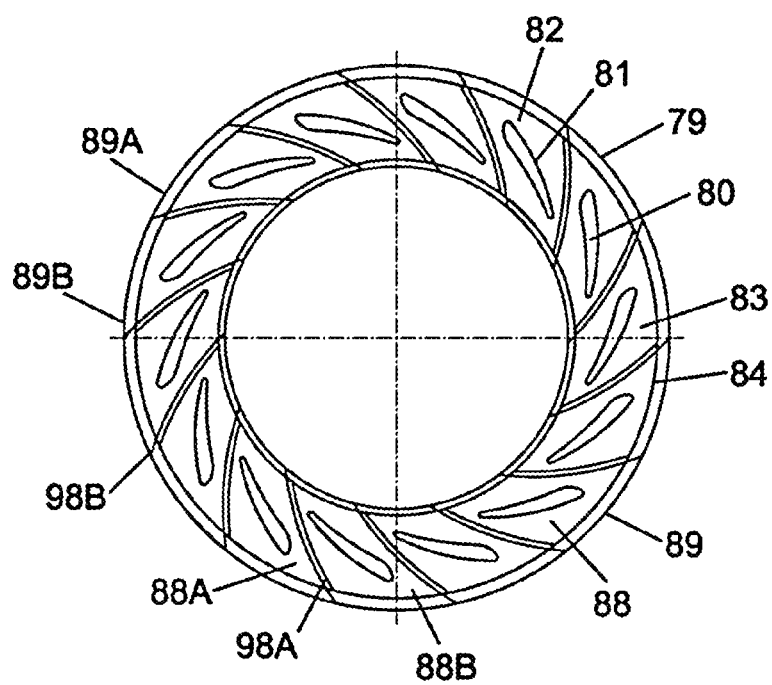
FIG. 14A is a front view of a shroud plate according to a fourth embodiment of the present invention.
Figure 14B:
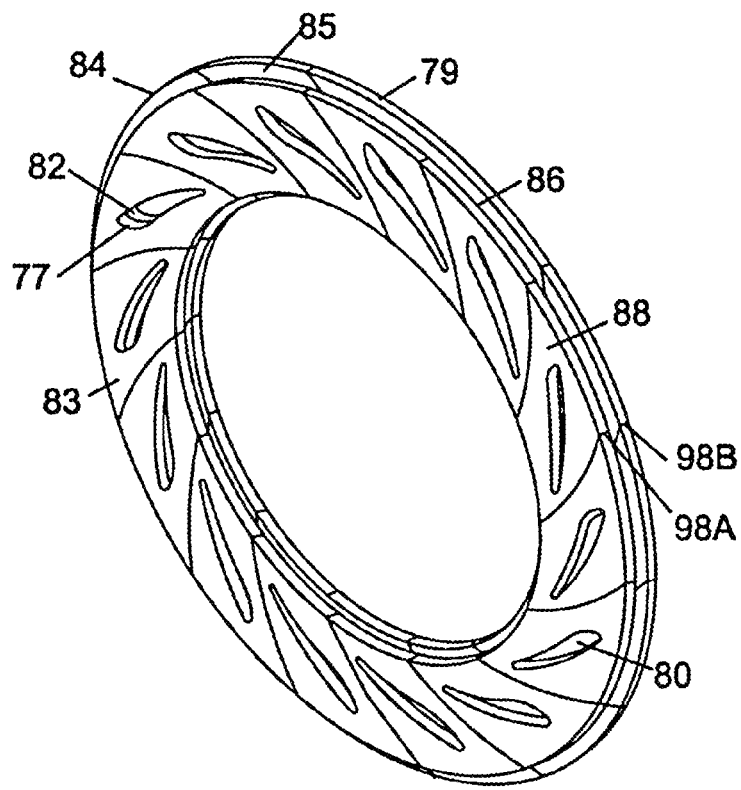
FIG. 14B is a perspective view of the shroud plate of FIG. 14A.

Referring now to FIGS. 14A and 14B, there is shown a fourth embodiment of a shroud plate 79 according to the present invention. The shroud plate 79 again defines an annular array of vane slots 80 defined by openings 81, 82 in a front plate 83 and a back plate 84 respectively. In this embodiment the back plate 84 has a larger outer diameter than the front plate 83 such that a radially outer annular region 85 of the back plate 84 extends radially beyond the periphery 86 of the front plate 83 for reasons that will be explained below in relation to FIGS. 16A to 17.

The cross-sectional shape of the openings 81 in the front plate 83 more closely matches the cross-sectional shape of vanes of a nozzle ring (not shown) with which the shroud plate 79 is intended to be used than the openings 82 in the back plate 84. In this way, the shroud plate 79 causes the minimum possible disturbance to gas flowing through an inlet volute of a turbine (not shown) in which the shroud plate 79 is to be used.

Figure 15:
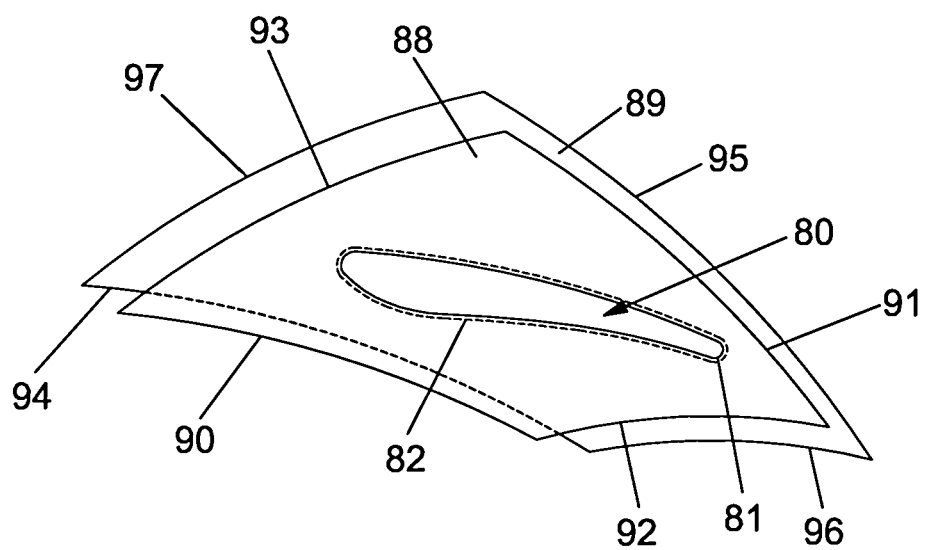
FIG. 15 is a front view of a segment of the shroud plate of FIG. 14A.

In this embodiment the front plate 83 and back plate 84 are each comprised of a plurality of discrete segments 88, 89 respectively. Each segment 88 in the front plate 83 is secured (for example, by brazing) to its respective axially adjacent segment 89 in the back plate 84 such that each pair of axially adjacent segments 88, 89 defines a pair of axially overlying openings 81, 82 which combine to define an axially extending vane slot 80 as is depicted in FIG. 15.

Each segment 88 of the front plate 83 has curved leading and trailing edges 90, 91 which are connected by curved radially inner and outer edges 92, 93. Similarly, each segment 89 in the back plate 84 has curved leading and trailing edges 94, 95 connected by curved radially inner and outer edges 96, 97. As can be seen from FIG. 15, each segment 88 in the front plate 83 is circumferentially offset with respect to the corresponding segment 89 in the back plate 84. In this way, the leading and trailing edges 90, 91 of the front segment 88 are positioned further forward as compared to the leading and trailing edges 94, 95 of the corresponding back segment 89. Additionally, each front segment 88 is radially narrower than its corresponding back segment 89 such that the concave radially inner edge 96 of each back segment 89 lies radially inwardly of the concave radially inner edge 92 of each front segment 88, and the convex radially outer edge 97 of each back segment 89 lies radially outwardly of the convex radially outer edge 93 of each front segment 88. The concave leading edges 90, 94 and convex trailing edges 91, 95 of the front and back plates 88, 89 extend generally radially outwardly. Each curved edge 90, 91, 94, 95 is swept forward of a radial line X (see FIG. 14A) passing through the centre of the shroud plate 79.

The radially inner edges 92, 96 and the radially outer edges 93, 97 of the front and back segments 88, 89 are also curved to an appropriate extent, taking into account the desired dimensions of the shroud plate 79 and the number of segments 88, 89 forming the shroud plate 79, which in this embodiment matches the number of vanes on the nozzle ring with which the shroud plate 79 is intended to be used. The leading edges 90, 94 of each front and back segment 88, 89 are swept forward to a greater extent than the trailing edges 91, 95 such that each pair of segments 88, 89 defines a scimitar-like cross-sectional shape in which the concave inner edge 92 of the front segment 88 is shorter than the convex radially outer edge 93 of the front segment 88, and the concave radially inner edge 96 of the back segment 89 is shorter than the convex radially outer edge 97 of the back segment 89.

The segments 88 forming the front plate 83 are circumferentially spaced from one another so as to define a small generally radially extending circumferential clearance 98A between the leading edge 90 of one segment 88A and the trailing edge 91 of a neighbouring segment 88B. A corresponding generally radially extending clearance 98B is defined between each pair of neighbouring segments 89A, 89B in the back plate 84. It will be appreciated that the clearances 98A, 98B between each pair of neighbouring segments 88, 89 in the front and back plates 83, 84 might present a leak path for gas flowing through a turbine in which the shroud plate 79 is being used. In order to obviate this problem, each segment 88 in the front plate 83 is circumferentially offset compared to its axially adjacent back segment 89 as can clearly be seen in FIG. 15. In this way, the clearances 98A, 98B in the front and back plates 83, 84 do not axially overlie. Rather, the clearance 98A between each pair of segments 88A, 88B in the front plate 83 is closed by a region of each back segment 89 which lies axially behind the trailing edge 91 of each front segment 88. The clearances 98A, 98B in the front and back plates 83, 84 permit radial and rotational displacement of one segment pair 88A,89A relative to its neighbouring segment pair 88B, 89B. In this way, each segment pair 88A, 89A can adopt precisely the correct position to receive a vane (not shown) attached to a nozzle ring (not shown) during use.

Figure 16A:
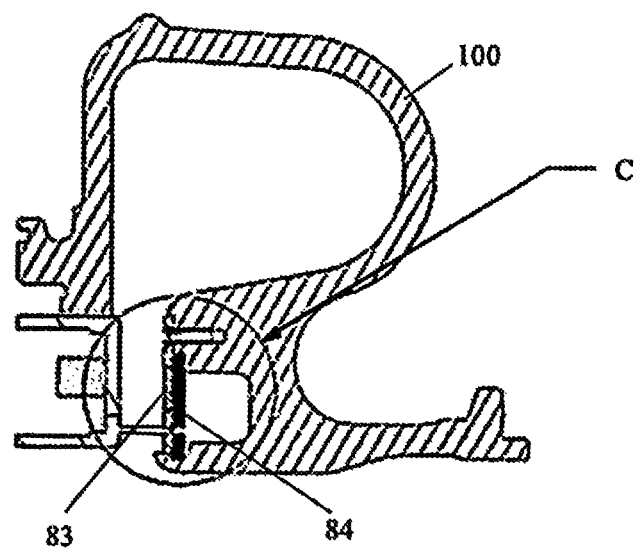
FIG. 16A is a cross-sectional view of an upper portion of a turbine housing with the shroud plate of FIG. 14A attached to the housing.
Figure 16B:
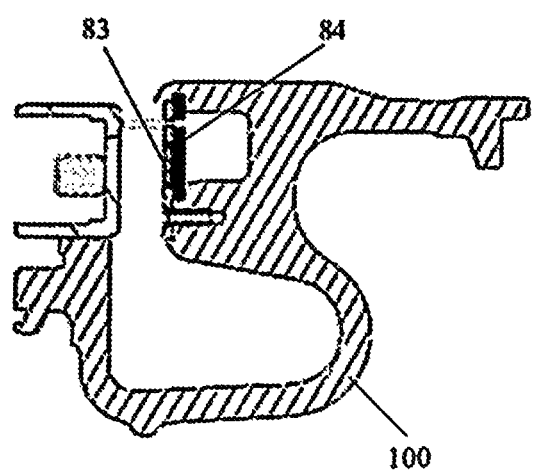
FIG. 16B is a cross-sectional view of the turbine housing and shroud plate of FIG. 16A.
Figure 17:
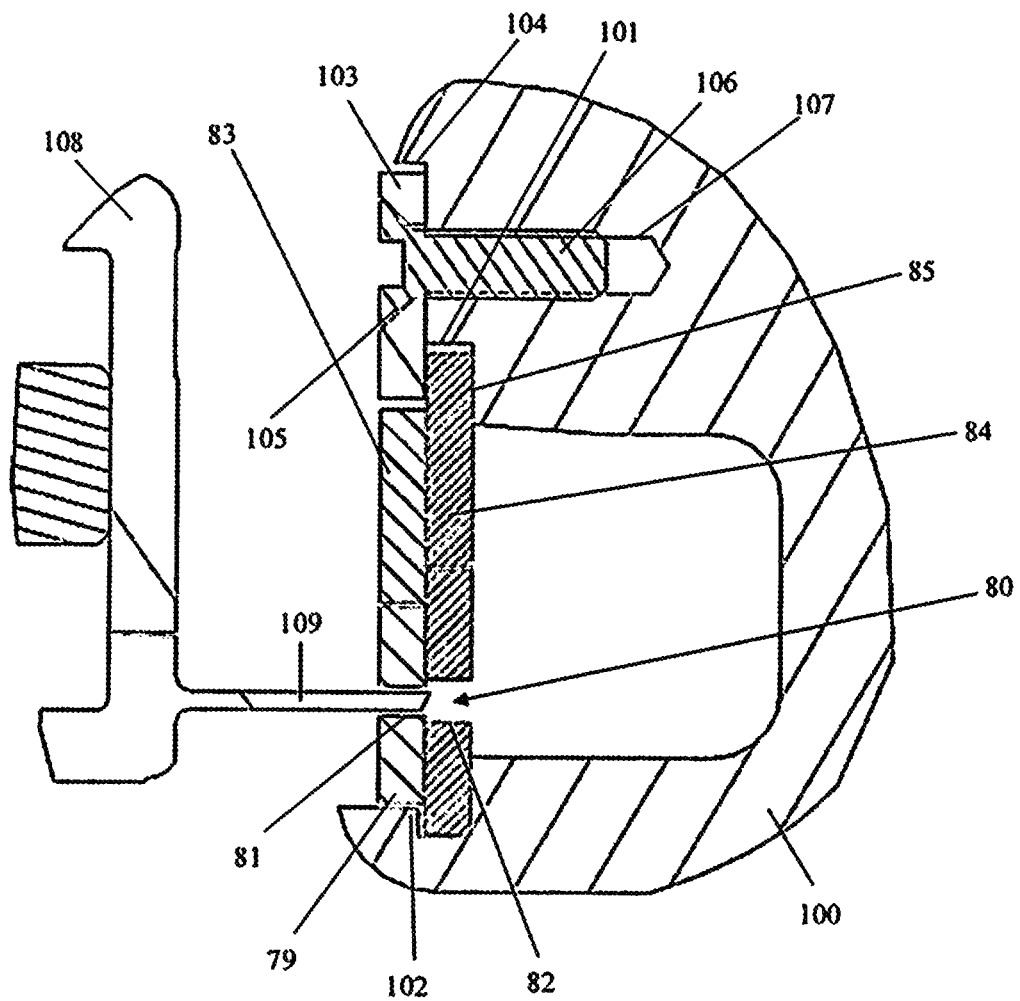
FIG. 17 is a detailed cross-sectional view of the circled region C of the turbine housing and shroud plate of FIG. 16A.

Referring now to FIGS. 16A, 16B and 17, the shroud plate 79 according to the fourth embodiment of the present invention is mounted within a turbine housing 100 by receipt of the back plate 84 in an annular recess 101 defined by the turbine housing 100 with the front plate 83 being received in a further annular recess 102 defined by the turbine housing 100. Once the front and back plates 83, 84 of the shroud plate 79 have been received in their respective recesses 102, 101, a retaining ring 103 is located towards the radially outer periphery of the shroud plate 79 in its own annular recess 104. As can be seen most clearly in FIG. 17, the ring 103 extends radially inwardly so as to axially overlie the region 85 of the back plate 84 which extends radially outwardly of the front plate 83. In this way, the ring 103 can be used to retain the back plate 84 against the turbine housing 100 and thereby retain the front plate 83 in place by virtue of each segment 88 in the front plate 83 being secured to its respective axially adjacent segment 89 in the back plate 84. The ring 103 defines apertures 105 for receipt of suitable fasteners 106, such as bolts, rivets or the like, which are received in axially extending holes 107 defined by the turbine housing 100.

After mounting the shroud plate 79 within the turbine housing 100 a nozzle ring 108 carrying a plurality of axially extending vanes 109 is then displaced axially towards the shroud plate 79 such that each vane 109 is inserted into its respective vane slot 80 defined by the overlying pairs of openings 81, 82 in the front and back plates 83, 84. In view of the segmentation of the front and back plates 83, 84 and the clearances 98A, 98B defined between each segment pair 88, 89, the segment pairs 88, 89 can displace radially and rotationally relative to one another so as to afford the optimum alignment of each segment pair 88, 89 with respect to its corresponding vane 109. In this way, the back plate 84 can be manufactured more simply and at lower cost since it needs only to define relatively wide tolerance openings 82. Additionally, since each opening 81 in the front plate 83 needs to be manufactured to a fine tolerance only in terms of its cross-sectional shape, rather than its position relative to the other openings 81, this allows the relative orientation of the vanes on the nozzle ring to be manufactured to a wider tolerance thereby simplifying production and reducing cost.

The front and back plates 83, 84 of the shroud plate 79 can be manufactured from any appropriate material, such as stainless steel. It may be advantageous to select a material for at least the back plate 84, if not also the front plate 83, which suits the thermal expansion of the turbine housing 100 during use. Suitable materials include 304 stainless steel for the front plate 83 and 420 stainless steel for the back plate 84.

While the shroud plate 79 may permit relative rotational and/or radial movement between pairs of axially adjacent segments 88, 89 in the front and back plates 83, 84 throughout operation of a turbine incorporating the shroud plate 79, the optimum positioning of each segment pair 88, 89 may be determined prior to use by insertion of the nozzle ring vanes 109 into the vane slots 80, adjustment of the segments 88, 89 to their mutually optimum positions followed by fixation of each segment pair 88, 89 relative to the other segment pairs, for example by brazing. In this way, the shroud plate 79 would be optimised for a particular nozzle ring 108 prior to use and then fixed in this optimum configuration for future use.

Figure 18A:
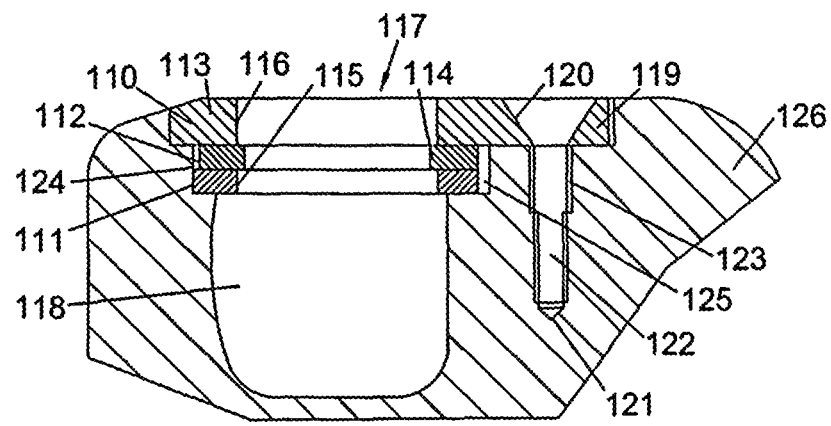
FIG. 18A is a cross-sectional view of a shroud plate according to a fifth embodiment of the present invention mounted within a turbine housing.
Figure 18B:
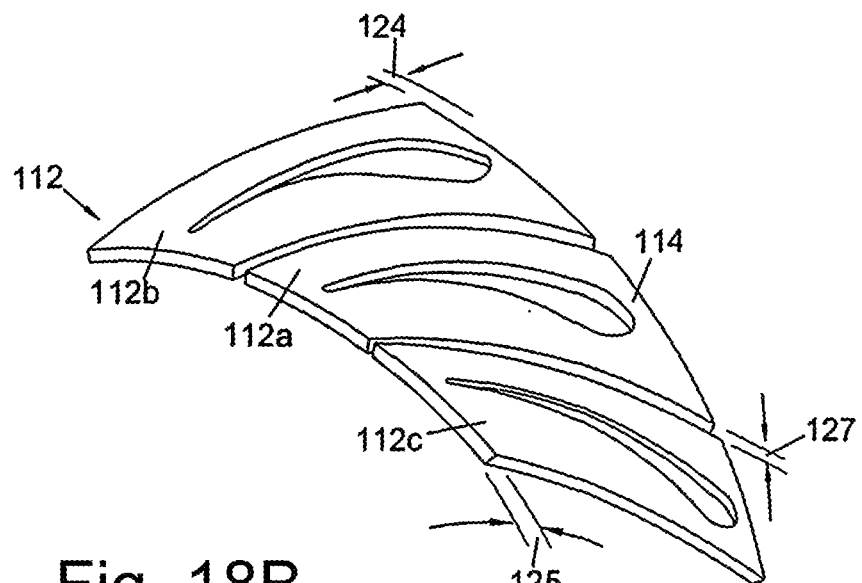
FIG. 18B is a perspective view of a section of a segmented annular plate forming part of the shroud plate FIG. 18A.

FIGS. 18A and 18B show a fifth embodiment of a shroud plate 110 according to a fifth embodiment. The shroud plate 110 comprises three coaxial, concentric plates consisting of a rear plate 111, an intermediate segmented plate 112 and a front plate 113. As can be seen from FIG. 18A, the intermediate plate 112 defines relatively fine tolerance openings 114 which axially overlie larger openings 115, 116 in the rear and front plates 111, 113 respectively so as to define vane slots 117 for receipt of vanes in a vane cavity 118 in the same way as the first four embodiments described above.

In the fifth embodiment, the intermediate segmented plate 112 is made up of an annular array of segments 112a of generally similar form to the segments described above in relation to the fourth embodiment. Each segment 112a of the intermediate plate 112 is supported between the front and rear plates 113, 111 so as to be radially and rotationally displaceable with respect to its neighbouring segments 112b, 112c. In this way, each segment 112a can adopt the optimum configuration to receive its respective vane. In the fifth embodiment, the segmented intermediate plate 112 defines a smaller outer diameter than the rear plate 111, which itself defines a smaller outer diameter than the front plate 113. The radially outer periphery of the front plate 113 thus extends radially outwardly compared to both the intermediate plate 112 and the rear plate 111. The front plate 113 defines a radially extended portion 119 which defines a tapered aperture 120 for receipt of a countersunk retaining bolt 121. The retaining bolt 121 defines a shaft 122 which is of narrower cross-section than the counter bore 123 which receives the shaft 122 of the bolt 121. In this way, a clearance is defined between the shaft of the bolt 122 and the bore 123 to accommodate thermal expansion flexing of these components.

It can be seen that radial clearances 124, 125 are defined radially outwardly of the intermediate plate 112 and radially inwardly of the plate 112 respectively. Moreover, even though the rear plate 111 defines a larger outer diameter than the intermediate plate 112, the rear plate 111 extends radially inwardly to the same extent as the intermediate plate 112 such that the clearance 125 defined between the turbine housing 126 and the radially inner periphery of the intermediate plate 112 is of constant radial dimension and extends axially beyond the radially inner edge of the rear plate 111 towards the turbine housing 126.

As shown in FIG. 18B not only are radial clearances 124, 125 defined beyond the radially outer and inner edges of the intermediate plate 112, but generally radially extending clearances 127 are also defined between each pair of adjacent segments 112a, 112b and 112a, 112c to afford sufficient clearance to accommodate radial and/or rotation movement between the segments 112a making up the intermediate plate 112.

It will be appreciated that the number of plates used in each of the shroud plates representing different embodiments of the present invention described above can be varied from the number described in respect of each embodiment. For example, the first and second embodiments in which each plate is fixed to it neighbouring plates are not limited to using three plates. Rather, two, four, five or more annular plates may be employed defining annular arrays of openings overlying one another so as to define appropriately dimensioned and positioned vane slots. Moreover, the means by which the shroud plates of the first and second embodiments are supported within a turbine housing is not limited to the use of an annular ring extending around the circumference of the shroud plate. The front plate or plates may have a larger outer diameter than one or more of the back plates, in a similar fashion to the third embodiment described above, such that the front plate or plates could be fastened to the turbine housing. Alternatively one or more of the back plates could possess a larger outer diameter than one or more of the front plates, in a similar fashion to the fourth embodiment, in which case an annular ring or other suitable fastener, such as a bolt, rivet or the like may be used to secure the back plate(s) to the turbine housing to hold the shroud plate in place.

Similarly, the shroud plates according to the third and fourth embodiments described above may incorporate any desirable number of annular plates and are not limited to using just two plates as described above in respect of the specific embodiments. For example, the third and/or fourth embodiments may incorporate three, four or more annular plates with annular arrays of openings which overlie one another so as to define appropriately dimensioned and positioned vane slots.

The cross-sectional shape and relative spacing of the vane slots defined by the shroud plates of each embodiment may take any convenient form and is not limited to the exact form depicted in FIGS. 3A to 18B. Moreover, while it is desirable that the fine tolerance openings have a cross-sectional shape which is very similar to the cross-sectional shape of the vanes connected to the nozzle ring with which the shroud plate is to be used, it will be appreciated that the size and shape of the wider tolerance openings may be varied from that shown in FIGS. 3A to 18B to suit a particular application and/or to reduce the cost and complexity of the manufacturing process.

The invention claimed is:
1. A variable geometry turbine comprising;
a turbine wheel supported in a housing for rotation about a turbine axis;
an annular inlet passage defined between respective radial inlet surfaces of first and second wall members, at least one of said first and second wall members being moveable along the turbine axis to vary the size of the inlet passage;

an array of vanes extending across the inlet passage, said vanes being connected to said first wall member;

a complementary array of vane slots defined by the second wall member, said vane slots being configured to receive said vanes to accommodate relative movement between the first and second wall members;

wherein the second wall member comprises a first plate defining a first array of openings so as to define said array of vane slots, said first plate comprising first and second segments defining respective first and second openings from said first array of openings, said first segment being displaceable relative to said second segment within a major plane of the first plate; and wherein the second wall member comprises a second plate and a third plate, each of the second and third plates being positioned axially adjacent to the first plate and being arranged co-axially with respect to said first plate, the second and third plates being disposed on opposite sides of the first plate such that the first plate forms an intermediate plate of the second wall member, wherein the second plate defines a second array of openings and the third plate defines a third array of openings, the second and third arrays of openings both overlying the first array of openings so as to define said array of vane slots.

2. A variable geometry turbine according to claim 1, wherein each of said segments comprises generally radially extending leading and trailing edges connected by radially inner and outer edges.

3. A variable geometry turbine according to claim 2, wherein at least one of said leading and trailing edges is curved relative to a radial line passing through said segment and the turbine axis.

4. A variable geometry turbine according to claim 1, wherein the second wall member comprises a second plate which is positioned axially adjacent to the first plate and said second plate being arranged co-axially with respect to said first plate, wherein the first array of openings overlies a second array of openings defined by the second plate so as to define said array of vane slots.

5. A variable geometry turbine according to claim 1, wherein the cross-sectional shape transverse to said turbine axis of at least one of the openings in said first array of openings more closely matches the cross-sectional shape transverse to said turbine axis of the vane that said at least one opening is arranged to receive than the cross-sectional shape transverse to said turbine axis of at least one of the openings in said second array of openings and at least one of the openings in said third array of openings.

6. A variable geometry turbine according to claim 1, wherein each of the first and second segments of the first plate is supported between the second and third plates so as to be radially and rotationally displaceable with respect to its adjacent segments.

7. A variable geometry turbine according to claim 1, wherein a radial clearance is defined radially outwardly of the first plate, between the first plate and the housing.

8. A variable geometry turbine according to claim 1, wherein a radial clearance is defined radially inwardly of the first plate, between the first plate and the housing.

9. A variable geometry turbine according to claim 1, wherein a generally radially extending clearance is defined between the first and second segments to afford sufficient clearance to accommodate relative radial and/or rotation movement of the first and second segments.

* * * * *